US012527959B2

(12) United States Patent
Feldman et al.

(10) Patent No.: US 12,527,959 B2
(45) Date of Patent: Jan. 20, 2026

(54) COMPLIANCE VOLTAGE MONITORING AND ADJUSTMENT IN AN IMPLANTABLE MEDICAL DEVICE USING LOW SIDE SENSING

(71) Applicant: Boston Scientific Neuromodulation Corporation, Valencia, CA (US)

(72) Inventors: Emanuel Feldman, Simi Valley, CA (US); Goran N. Marnfeldt, Valencia, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 383 days.

(21) Appl. No.: 17/451,387

(22) Filed: Oct. 19, 2021

(65) Prior Publication Data

US 2022/0161033 A1    May 26, 2022

Related U.S. Application Data

(60) Provisional application No. 63/116,519, filed on Nov. 20, 2020.

(51) Int. Cl.
    *A61N 1/36*        (2006.01)
    *A61N 1/02*        (2006.01)
    *A61N 1/05*        (2006.01)

(52) U.S. Cl.
    CPC ........... *A61N 1/36153* (2013.01); *A61N 1/05* (2013.01)

(58) Field of Classification Search
    CPC ...... A61N 1/36153; A61N 1/05; A61N 1/025; A61N 1/36125; A61N 1/36; A61N 1/02
    See application file for complete search history.

(56) References Cited

U.S. PATENT DOCUMENTS 3,646,940 A    3/1972 Timm et al.
3,724,467 A    4/1973 Avery et al.
               (Continued)

FOREIGN PATENT DOCUMENTS

EP       1686692      8/2006
WO    1999/052163    10/1999
              (Continued)

OTHER PUBLICATIONS

Ki, Wing-Hung, et al., "Analysis and Design Strategy of On-Chip Charge Pumps for Micro-Power Energy Harvesting Applications," IFIP/IEEE International Conference on Very Large Scale Integration—System on a Chip, vol. 379, pp. 158-186 (2011).
(Continued)

*Primary Examiner* — Jennifer Pitrak McDonald
*Assistant Examiner* — Megan T Fedorky
(74) *Attorney, Agent, or Firm* — Lewis & Reese, PLLC

(57) ABSTRACT

An architecture is disclosed for an Implantable Pulse Generator having improved compliance voltage monitoring and adjustment software and hardware. Software specifies which stimulation pulses are to be measured as relevant to monitoring and adjusting the compliance voltage. During compliance voltage monitoring, "high-side" anode electrode node voltages referenced to the compliance voltage are considered as are "low-side" cathode electrode node voltages referenced to ground. Translation stages are used to convert only the anode electrode node voltages to ground as low-side signals. This allows compliance voltage monitoring and adjustment to occur using only low-side signals, which eases sensing and reduces design complexity.

19 Claims, 18 Drawing Sheets

(56) References Cited

U.S. PATENT DOCUMENTS

| | | |
|---|---|---|
| 3,733,498 A | 5/1973 | Watson |
| 3,822,708 A | 7/1974 | Zilber |
| 4,050,004 A | 9/1977 | Greatbatch |
| 4,134,408 A | 1/1979 | Brownlee et al. |
| 4,197,850 A | 4/1980 | Schulman |
| 4,231,027 A | 10/1980 | Mann |
| 4,232,679 A | 11/1980 | Schulman |
| 4,324,251 A | 4/1982 | Mann |
| 4,532,930 A | 8/1985 | Crosby |
| 4,793,353 A | 12/1988 | Borkan |
| 5,193,539 A | 3/1993 | Schulman et al. |
| 5,193,540 A | 3/1993 | Schulman et al. |
| 5,312,439 A | 5/1994 | Loeb |
| 5,405,367 A | 4/1995 | Schulman et al. |
| 5,433,737 A | 7/1995 | Aimone |
| 5,643,330 A | 7/1997 | Holsheimer |
| 5,723,969 A | 3/1998 | Archer et al. |
| 5,733,313 A | 3/1998 | Barreras et al. |
| 5,757,167 A | 5/1998 | Aurora et al. |
| 5,814,089 A | 9/1998 | Stokes et al. |
| 5,818,703 A | 10/1998 | Jacobson |
| 5,836,981 A | 11/1998 | Chang et al. |
| 5,847,551 A | 12/1998 | Aurora et al. |
| 5,959,371 A | 9/1999 | Dooley |
| 6,035,235 A | 3/2000 | Perttu et al. |
| 6,035,237 A | 3/2000 | Schulman et al. |
| 6,051,017 A | 4/2000 | Loeb et al. |
| 6,061,596 A | 5/2000 | Richmond et al. |
| 6,076,018 A | 6/2000 | Sturman |
| 6,164,284 A | 12/2000 | Schulman et al. |
| 6,175,764 B1 | 1/2001 | Loeb et al. |
| 6,181,965 B1 | 1/2001 | Loeb et al. |
| 6,181,969 B1 | 1/2001 | Gord |
| 6,185,452 B1 | 2/2001 | Schulman |
| 6,185,455 B1 | 2/2001 | Loeb et al. |
| 6,201,234 B1 | 3/2001 | Chow et al. |
| 6,208,894 B1 | 3/2001 | Schulman et al. |
| 6,208,896 B1 | 3/2001 | Mulhauser |
| 6,214,032 B1 | 4/2001 | Loeb et al. |
| 6,289,246 B1 | 9/2001 | Money |
| 6,315,721 B2 | 11/2001 | Schulman et al. |
| 6,317,628 B1 | 11/2001 | Linder et al. |
| 6,324,426 B1 | 11/2001 | Thompson |
| 6,355,990 B1 | 3/2002 | Mitchell |
| 6,363,277 B1 | 3/2002 | Dooley et al. |
| 6,370,046 B1 | 4/2002 | Nebrigic et al. |
| 6,392,580 B1 | 5/2002 | Swanson |
| 6,429,632 B1 | 8/2002 | Forbes et al. |
| 6,442,422 B1 | 8/2002 | Duckert |
| 6,516,227 B1 | 2/2003 | Meadows et al. |
| 6,525,949 B1 | 2/2003 | Johnson et al. |
| 6,553,263 B1 | 4/2003 | Meadows et al. |
| 6,597,950 B2 | 7/2003 | Linder |
| 6,609,029 B1 | 8/2003 | Mann |
| 6,631,296 B1 | 10/2003 | Parramon et al. |
| 6,668,193 B2 | 12/2003 | Ware et al. |
| 6,690,974 B2 | 2/2004 | Archer |
| 6,704,597 B1 | 3/2004 | Ware et al. |
| 6,741,892 B1 | 5/2004 | Meadows |
| 6,745,077 B1 | 6/2004 | Griffith et al. |
| 6,756,772 B2 | 6/2004 | McGinnis |
| 6,799,070 B2 | 9/2004 | Wolfe et al. |
| 6,826,430 B2 | 11/2004 | Faltys et al. |
| 6,856,838 B2 | 2/2005 | Parramon et al. |
| 6,871,090 B1 | 3/2005 | He et al. |
| 6,873,874 B2 | 3/2005 | Ware et al. |
| 6,909,915 B2 | 6/2005 | Greatbatch et al. |
| 6,934,584 B1 | 8/2005 | Wong et al. |
| 7,009,313 B1 | 3/2006 | Parramon et al. |
| 7,079,900 B2 | 7/2006 | Greenburg et al. |
| 7,127,298 B1 | 10/2006 | He et al. |
| 7,151,963 B2 | 12/2006 | Havel et al. |
| 7,177,698 B2 | 2/2007 | Klosterman et al. |
| 7,200,434 B2 | 4/2007 | Havel et al. |
| 7,203,539 B2 | 4/2007 | Ware et al. |
| 7,203,549 B2 | 4/2007 | Schommer et al. |
| 7,235,050 B2 | 6/2007 | Schulman et al. |
| 7,263,406 B2 | 8/2007 | Toy et al. |
| 7,272,445 B2 | 9/2007 | Phillips et al. |
| 7,304,871 B2 | 12/2007 | Ito et al. |
| 7,307,385 B2 | 12/2007 | Yamamoto et al. |
| 7,400,283 B1 | 7/2008 | Zhu |
| 7,444,181 B2 | 10/2008 | Shi et al. |
| 7,483,748 B2 | 1/2009 | Torgerson et al. |
| 7,519,428 B1 | 4/2009 | Palmer |
| 7,539,538 B2 | 5/2009 | Parramon et al. |
| 7,623,916 B2 | 11/2009 | Julian |
| 7,801,600 B1 | 9/2010 | Carbunaru et al. |
| 7,801,602 B2 | 9/2010 | McClure et al. |
| 7,805,189 B2 | 9/2010 | Stein et al. |
| 7,872,884 B2 | 1/2011 | Parramon et al. |
| 7,881,803 B2 | 2/2011 | Parramon et al. |
| 7,890,182 B2 | 2/2011 | Parramon et al. |
| 7,949,393 B2 | 5/2011 | Varrachio et al. |
| 8,131,377 B2 | 3/2012 | Shi et al. |
| 8,175,719 B2 | 5/2012 | Shi et al. |
| 8,219,196 B2 | 7/2012 | Torgerson |
| 8,538,548 B2 | 9/2013 | Shi et al. |
| 8,606,362 B2 | 12/2013 | He et al. |
| 8,620,436 B2 | 12/2013 | Parramon et al. |
| 8,649,858 B2 | 2/2014 | Griffith et al. |
| 8,768,453 B2 | 7/2014 | Parramon et al. |
| 8,781,598 B2 | 7/2014 | Shi et al. |
| 9,002,465 B2 | 4/2015 | Ranu |
| 9,008,790 B2 | 4/2015 | Griffith et al. |
| 9,014,813 B2 | 4/2015 | Foutz et al. |
| 9,037,241 B2 | 5/2015 | Lamont et al. |
| 9,061,140 B2 | 6/2015 | Shi et al. |
| 9,155,891 B2 | 10/2015 | Archer |
| 9,174,051 B2 | 11/2015 | Marnfeldt et al. |
| 9,220,901 B2 | 12/2015 | Gururaj et al. |
| 9,233,254 B2 * | 1/2016 | Nimmagadda ......... H02M 3/07 |
| 9,259,574 B2 | 2/2016 | Aghassian et al. |
| 9,308,373 B2 | 4/2016 | Lee |
| 9,314,632 B2 | 4/2016 | Marnfeldt et al. |
| 9,327,135 B2 | 5/2016 | Vansickle et al. |
| 9,352,162 B2 | 5/2016 | Lamont et al. |
| 9,397,639 B2 | 7/2016 | Feldman et al. |
| 9,616,233 B2 | 4/2017 | Shi et al. |
| 9,731,116 B2 | 8/2017 | Chen |
| 9,750,938 B2 | 9/2017 | Ternes et al. |
| 9,872,995 B2 | 1/2018 | Nimmagadda et al. |
| 10,420,935 B2 | 9/2019 | Illegems et al. |
| 10,525,252 B2 | 1/2020 | Feldman et al. |
| 2002/0072770 A1 | 6/2002 | Pless |
| 2002/0077670 A1 | 6/2002 | Archer et al. |
| 2002/0087196 A1 | 7/2002 | Ware et al. |
| 2003/0074037 A1 | 4/2003 | Moore et al. |
| 2003/0125773 A1 | 7/2003 | Havel et al. |
| 2003/0187484 A1 | 10/2003 | Davis et al. |
| 2003/0204224 A1 | 10/2003 | Torgerson et al. |
| 2003/0234631 A1 | 12/2003 | Schulman et al. |
| 2004/0059392 A1 | 3/2004 | Parramon et al. |
| 2004/0111123 A1 | 6/2004 | Ware et al. |
| 2004/0167407 A1 | 8/2004 | Roberts |
| 2004/0183607 A1 | 9/2004 | Moore |
| 2005/0021108 A1 | 1/2005 | Klosterman et al. |
| 2005/0027318 A1 | 2/2005 | Ware et al. |
| 2005/0057905 A1 | 3/2005 | He et al. |
| 2005/0075684 A1 | 4/2005 | Phillips et al. |
| 2005/0075685 A1 | 4/2005 | Forsberg et al. |
| 2005/0075686 A1 | 4/2005 | Phillips et al. |
| 2005/0075688 A1 | 4/2005 | Toy et al. |
| 2005/0075689 A1 | 4/2005 | Toy et al. |
| 2005/0075690 A1 | 4/2005 | Toy et al. |
| 2005/0075691 A1 | 4/2005 | Phillips et al. |
| 2005/0075692 A1 | 4/2005 | Schommer et al. |
| 2005/0165451 A1 | 7/2005 | Ware et al. |
| 2005/0212501 A1 | 9/2005 | Acatrinei |
| 2005/0226019 A1 | 10/2005 | Nastase |
| 2005/0228453 A1 | 10/2005 | Havel et al. |
| 2005/0270812 A1 | 12/2005 | Vinciarelli |
| 2005/0275382 A1 | 12/2005 | Stessman et al. |
| 2006/0066379 A1 | 3/2006 | Hopseger |

(56) References Cited

U.S. PATENT DOCUMENTS

| | | |
|---|---|---|
| 2006/0173493 A1 | 8/2006 | Armstrong et al. |
| 2006/0276857 A1 | 12/2006 | Forsberg et al. |
| 2007/0016263 A1 | 1/2007 | Armstrong et al. |
| 2007/0038250 A1 | 2/2007 | He et al. |
| 2007/0097719 A1 | 5/2007 | Parramon et al. |
| 2007/0100399 A1 | 5/2007 | Parramon et al. |
| 2007/0135868 A1* | 6/2007 | Shi ............... A61N 1/36071 607/62 |
| 2007/0146020 A1 | 6/2007 | Williams |
| 2007/0208261 A1 | 9/2007 | Maniak et al. |
| 2007/0212596 A1 | 9/2007 | Nebrigic et al. |
| 2007/0276450 A1 | 11/2007 | Meadows et al. |
| 2007/0288068 A1 | 12/2007 | Toy et al. |
| 2008/0015657 A1 | 1/2008 | Haefner |
| 2008/0048729 A1 | 2/2008 | Ehrenreich |
| 2008/0114231 A1 | 5/2008 | Dai et al. |
| 2008/0127478 A1 | 6/2008 | Phillips et al. |
| 2008/0136386 A1 | 6/2008 | Nastase |
| 2008/0319497 A1 | 12/2008 | Griffith et al. |
| 2008/0319514 A1 | 12/2008 | Shi et al. |
| 2009/0018618 A1 | 1/2009 | Parramon et al. |
| 2009/0024187 A1 | 1/2009 | Erickson et al. |
| 2009/0043244 A1 | 2/2009 | Inan |
| 2009/0062883 A1 | 3/2009 | Meadows et al. |
| 2009/0316743 A1 | 12/2009 | Alfrey |
| 2010/0164579 A1 | 7/2010 | Acatrinei |
| 2010/0211132 A1 | 8/2010 | Nimmagadda et al. |
| 2010/0256712 A1 | 10/2010 | Varrichio et al. |
| 2010/0268309 A1* | 10/2010 | Parramon ............ A61N 1/37205 607/116 |
| 2011/0110127 A1 | 5/2011 | Lee |
| 2011/0121801 A1 | 5/2011 | Scaldaferri et al. |
| 2012/0095529 A1 | 4/2012 | Parramon et al. |
| 2012/0239108 A1 | 9/2012 | Foutz |
| 2013/0023943 A1 | 1/2013 | Parramon et al. |
| 2013/0073008 A1 | 3/2013 | Ternes et al. |
| 2013/0184794 A1 | 7/2013 | Feldman et al. |
| 2013/0289661 A1 | 10/2013 | Griffith et al. |
| 2013/0289665 A1 | 10/2013 | Marnfeldt et al. |
| 2013/0310897 A1 | 11/2013 | Marnfeldt et al. |
| 2013/0338732 A1 | 12/2013 | Foutz |
| 2014/0018883 A1 | 1/2014 | Shi et al. |
| 2014/0266375 A1 | 9/2014 | Feldman et al. |
| 2015/0066108 A1 | 3/2015 | Shi et al. |
| 2015/0134029 A1 | 5/2015 | Ozawa et al. |
| 2015/0144183 A1 | 5/2015 | Yang et al. |
| 2015/0157861 A1 | 6/2015 | Aghassian |
| 2015/0360038 A1 | 12/2015 | Zottola et al. |
| 2016/0051825 A1 | 2/2016 | Ter-Petrosyan et al. |
| 2016/0144184 A1* | 5/2016 | Marnfeldt ............ A61N 1/36146 607/63 |
| 2018/0071511 A1 | 3/2018 | Marnfeldt et al. |
| 2018/0071512 A1* | 3/2018 | Feldman ............... A61N 1/025 |
| 2018/0071513 A1 | 3/2018 | Weiss et al. |
| 2018/0071514 A1* | 3/2018 | Wagenbach .......... A61N 1/025 |
| 2018/0071520 A1 | 3/2018 | Weerakoon et al. |
| 2018/0071527 A1 | 3/2018 | Feldman et al. |
| 2019/0083796 A1 | 3/2019 | Weerakoon et al. |
| 2020/0346019 A1 | 11/2020 | Weiss et al. |

FOREIGN PATENT DOCUMENTS

| | | |
|---|---|---|
| WO | 2000/000251 | 1/2000 |
| WO | 2000/021607 | 4/2000 |
| WO | 2002/009808 | 2/2002 |
| WO | 2003/047685 | 6/2003 |
| WO | 2005/042087 | 5/2005 |
| WO | 2005/042092 | 5/2005 |
| WO | 2005/042093 | 5/2005 |
| WO | 2005/042094 | 5/2005 |
| WO | 2005/042095 | 5/2005 |
| WO | 2005/042096 | 5/2005 |
| WO | 2005/042097 | 5/2005 |
| WO | 2005/042098 | 5/2005 |
| WO | 2007/070727 | 6/2007 |
| WO | 2010/096131 | 8/2010 |
| WO | 2011/033489 | 3/2011 |
| WO | 2021/046120 | 3/2021 |

OTHER PUBLICATIONS

Document # IPCOM000016848D, published at www.ip.com (Jul. 18, 2003).

Document # IPCOM000007552D, published at www.ip.com (Apr. 4, 2002).

M. Ghovanloo, et al., "A Compact Large Voltage-Compliance High Output-Impedance Programmable Current Source for Implantable Microstimulators," IEEE Transactions on Biomedical Engineering, vol. 52, No. 1, Jan. 2005.

M. Sivaprakasam et al., "A Variable Range Bi-Phasic Current Stimulus Driver Circuitry for an Implantable Retinal Prosthetic Device," IEEE Journal of Solid-State Circuits, vol. 40, No. 3, Mar. 2005.

A. Uranga, et al., "Special Section of Functional Electrical Stimulation: An Integrated Implantable Electrical Sacral Root Stimulator for Bladder Control," International Neuromodulation Society, Neuromodulation, vol. 5, No. 4, 2002.

Emilia Noorsal, et al., "A Neural Stimulator Frontend With High-Voltage Compliance and Programmable Pulse Shape for Epiretinal Implants", IEEE Journal of Solid-State Circuits, IEEE Service Center, Piscataway, NJ, USA, vol. 47, No. I, Jan. 1, 2012.

Pylarinos, Louie, "Charge Pumps: An Overview" in *Proceedings of the IEEE International Symposium on Circuits and Systems*, 2003.

Chebli, Robert, et al., "A Wide Tuning Range Voltage-Controlled Ring Oscillator Dedicated to Ultrasound Transmitter", presented at International Conference on Microelectronics, Dec. 2004.

Sun, et al., "Power Management in a Bio-telemetry Application", Power Electronics Specialists Conference 2005, ISBN: 978-0-7803-9033-1, pp. 1182-1190, Jan. 1, 2005.

International Search Report and Written Opinion regarding corresponding PCT Application No. PCT/US2021/071926, mailed Jan. 28, 2022.

\* cited by examiner

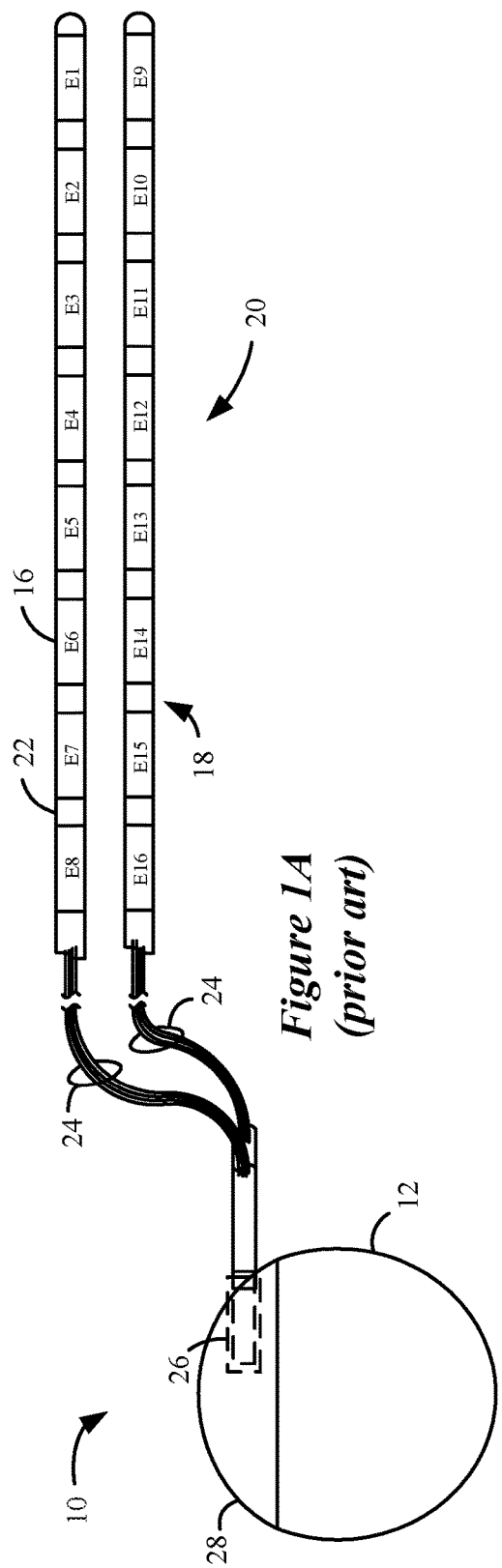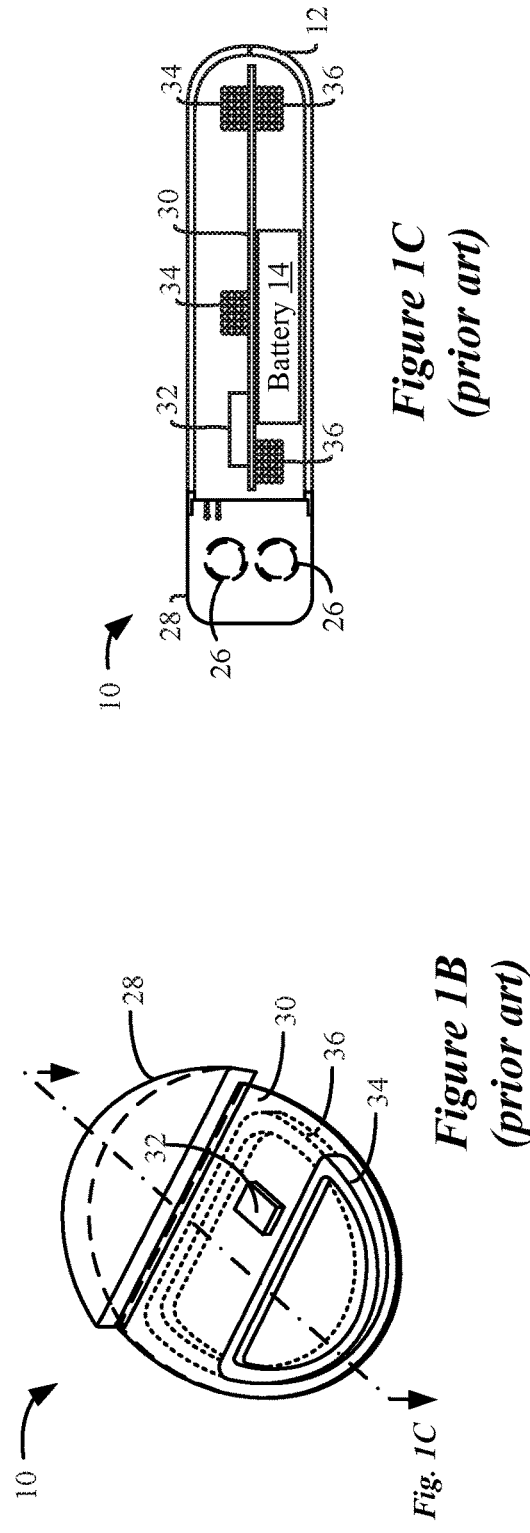
*Figure 1A (prior art)*
*Figure 1B (prior art)*
*Figure 1C (prior art)*

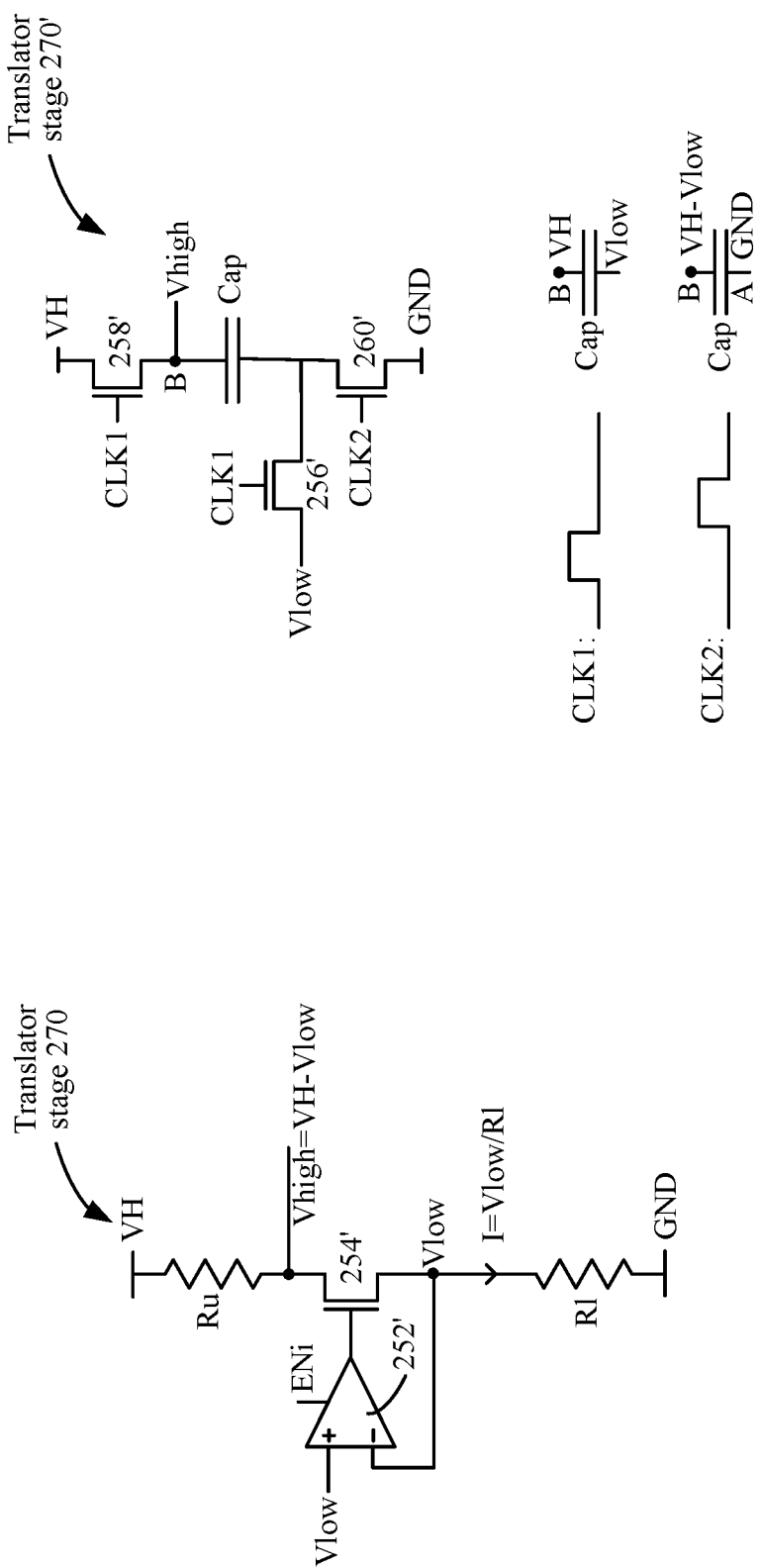

COMPLIANCE VOLTAGE MONITORING AND ADJUSTMENT IN AN IMPLANTABLE MEDICAL DEVICE USING LOW SIDE SENSING

CROSS REFERENCE TO RELATED APPLICATIONS

This is a non-provisional application of U.S. Provisional Patent Application Ser. No. 63/116,519, filed Nov. 20, 2020, which is incorporated herein by reference and to which priority is claimed.

FIELD OF THE INVENTION

The present invention relates generally to implantable medical devices, and more particularly to improved compliance voltage monitoring and adjustment in an implantable pulse generator.

INTRODUCTION

Implantable stimulation devices are devices that generate and deliver electrical stimuli to body nerves and tissues for the therapy of various biological disorders, such as pacemakers to treat cardiac arrhythmia, defibrillators to treat cardiac fibrillation, cochlear stimulators to treat deafness, retinal stimulators to treat blindness, muscle stimulators to produce coordinated limb movement, spinal cord stimulators to treat chronic pain, cortical and deep brain stimulators to treat motor and psychological disorders, and other neural stimulators to treat urinary incontinence, sleep apnea, shoulder subluxation, etc. The description that follows will generally focus on the use of the invention within a Spinal Cord Stimulation (SCS) system, such as that disclosed in U.S. Pat. No. 6,516,227. However, the present invention may find applicability in any implantable medical device system, including a Deep Brain Stimulation (DBS) system.

As shown in FIGS. 1A-1C, an SCS system typically includes an Implantable Pulse Generator (IPG) 10, which includes a biocompatible device case 12 formed of a conductive material such as titanium for example. The case 12 typically holds the circuitry and power source (e.g., battery) 14 (FIG. 1C) necessary for the IPG 10 to function, although IPGs can also be powered via external RF energy and without a battery. The IPG 10 is coupled to electrodes 16 via one or more electrode leads 18, such that the electrodes 16 form an electrode array 20. The electrodes 16 are carried on a flexible body 22, which also houses the individual signal wires 24 coupled to each electrode. In the illustrated embodiment, there are eight electrodes (Ex) on two leads 18 for a total of sixteen electrodes 16, although the number of leads and electrodes is application specific and therefore can vary. The leads 18 couple to the IPG 10 using lead connectors 26, which are fixed in a non-conductive header material 28, which can comprise an epoxy for example.

As shown in the cross-section of FIG. 1C, the IPG 10 typically includes a printed circuit board (PCB) 30, along with various electronic components 32 mounted to the PCB 30, some of which are discussed subsequently. Two antennas are shown in the IPG 10: a telemetry antenna 34 used to transmit/receive data to/from an external communication device (not shown); and a charging coil 36 for charging or recharging the IPG's battery 14 using an external charger (not shown). FIG. 1B shows these aspects in perspective with the case 12 removed for easier viewing. Charging coil 36 preferably comprises a coil, which receives power from an external charger by magnetic induction. Telemetry antenna 34 may also comprise a magnetic-induction coil, or may alternatively comprise a short range RF antenna for wirelessly communicating in accordance with a short-range RF standard such as Bluetooth, WiFi, MICS, Zigbee, etc., as described in U.S. Patent Application Publication 2016/0051825. Telemetry antenna 34 may be located within the case 12, or may be located within the header 28 in other examples.

FIG. 2 shows an architecture for the circuitry in IPG 10, which is disclosed in U.S. Patent Application Publications 2018/0071513 and 2018/0071520. The architecture includes at least one Application Specific Integrated Circuit (ASIC) 60. ASIC 60 includes a microcontroller block 50, which as shown in FIG. 2 can communicate with other functional blocks in the ASIC 60 via internal bus 92. Internal bus 92 can also connect to an external bus 90, and thus other control circuitry, or other circuitry more generally, on the IPG 10's PCB 30. In one example, the microcontroller block 50 can comprise circuitry from an ARM Cortex-M0+ Processor, which may be incorporated into the monolithic integrated circuit of the ASIC 60 by licensing various necessary circuits from the library that comprises that processor. ASIC 60 can comprise a monolithic integrated circuit formed on its own semiconductive substrate ("chip"), and may be contained in its own package and mounted to the IPG 10's PCB 30.

FIG. 2 shows various functional circuit blocks within ASIC 60 in addition to the microcontroller block 50, which are briefly described. As mentioned, ASIC 60 includes an internal bus 92, and each of the functional blocks includes interface circuitry 88 enabling communication on the internal bus 92. Interface circuitry 88 helps each block recognize when microcontroller block 50 is communicating addresses pertaining to that block via bus 92.

ASIC 60 contains several terminals 61 (e.g., pins, bond pads, solder bumps, etc.), such as those necessary to connect to the external bus 90, the battery 14, the antennas 34 and 36, external memory (not shown), etc. ASIC terminals 61 include electrode nodes 61a (E1'-E16' and Ec') which circuit nodes are also present on the PCB 30 (FIG. 1C) inside of the IPG's case 12. The electrode nodes 61a connect to the electrodes 16 (E1-E16) on the lead(s) 18 outside of the case 12 by way of DC-blocking capacitors 55. As is known, DC-blocking capacitors 55 are useful to ensure that DC current isn't inadvertently (e.g., in the event of failure of the ASIC 60's circuitry) injected into the patient's tissue, and hence provide safety to the IPG 10. Such DC-blocking capacitors 55 can be located on or in the IPG 10's PCB 30. See U.S. Patent Application Publication 2015/0157861. Note that there is also an electrode node 61a Ec' which is connected to the case 12 (preferably by a DC-blocking capacitor 55), thus allowing the case 12 to operate as an electrode 16 (Ec). ASIC 60 may support other numbers or types of electrode nodes/electrodes (e.g., thirty-two electrodes E1-E32 plus the case Ec).

Each of the circuit blocks in ASIC 60 performs various functions in IPG 10. Telemetry block 64 couples to the IPG telemetry antenna 34, and includes transceiver circuitry for wirelessly communicating with an external device according to a telemetry protocol. Such protocol may comprise Frequency Shift Keying (FSK), Amplitude Shift Keying (ASK), or various short-range RF standards such as those mentioned above. Charging/protection block 62 couples to the IPG charging coil 36, and contains circuitry for rectifying power wirelessly received at the charging coil 36 from an external charger (not shown), and for charging the battery 14 in a controlled fashion. See U.S. Patent Application Publication 2013/0023943.

Analog-to-Digital (A/D) block 66 digitizes various analog signals for interpretation by the IPG 10, such as the battery voltage Vbat, the compliance voltage VH (discussed in detail below), or voltages appearing at the electrode nodes 61*a*, and is coupled to an analog bus 67 containing such voltages. A/D block 66 may further receive signals from a sample and hold block 68. See U.S. Pat. No. 9,061,140 (discussing sample and hold circuitry). For example, sample and hold circuitry 68 may determine a voltage difference between two electrode nodes, which voltage difference may then be digitized at A/D block 66. Knowing the difference in voltage between two electrodes when they pass a constant current allows for a determination of the (tissue) resistance between them, which is useful for a variety of reasons.

Clock generation block 74 can be used to generate a clock for the ASIC 60 and communication on the bus 92. Clock generation block 74 may receive an oscillating signal from an off-chip crystal oscillator 56, or may comprise other forms of clock circuitry located completely on chip, such as a ring oscillator. See U.S. Patent Application Publication 2014/0266375 (disclosing an on-chip circuit that can be used to generate a clock signal on the ASIC 60).

Nonvolatile memory (NOVO) block 78 caches any relevant data in the system (such as log data). Additional memory (not shown) can also be provided off-chip via a serial interface block 84, or can be connected to external bus 90.

ASIC 60 further includes a stimulation circuitry block 70, which includes circuitry for receiving and storing stimulation parameters from the microcontroller block 50 via bus 92. Stimulation parameters define the shape and timing of stimulation pulses to be formed at the electrodes, and can include parameters such as which electrodes E1-E16 or Ec will be active; whether those active electrodes are to act as anodes that source current to a patient's tissue, or cathodes that sink current from the tissue; and the amplitude (A), duration (D), and frequency (f) of the pulses. Amplitude may comprise a voltage or current amplitude. Such stimulation parameters may be stored in registers in the stimulation circuitry block 70. See, e.g., U.S. Patent Application Publications 2013/0289661; 2013/0184794.

Simulation circuitry block 70 also includes current generation circuitry such as Digital-to-Analog Converter (DAC) circuitry 72 for receiving the stimulation parameters from the registers and for forming the prescribed pulses at the selected electrodes. FIG. 3 shows a simple example of DAC circuitry 72 operating to provide current pulses between selected electrodes E1 and E2 and through a patient's tissue, Rt. (Rt may also include other resistances inherent in the system, such as the resistance of the electrodes themselves). A more complete description of DAC circuitry 72 is provided later, starting with FIG. 4A. DAC circuitry 72 as shown comprises two portions, denoted as PDAC 72*p* and NDAC 72*n*. These portions of DAC circuitry 72 are so named because of the polarity of the transistors used to build them and the polarity of the currents they provide. Thus, the PDAC is formed primarily from P-channel transistors and is used to source a current +I to the patient's tissue Rt via a selected electrode E1 operating as an anode. The NDAC is formed primarily from N-channel transistors and is used to sink current −I from the patient's tissue via a selected electrode E2. The current sourced to the tissue at any given time usually equals that sunk from the tissue to prevent charge from building in the tissue, although more than one anode electrode and more than one cathode electrode may be operable at a given time.

The PDAC and NDAC receive digital control signals from the registers in the stimulation circuitry block 70, generically denoted <Pstim> and <Nstim>, to generate the prescribed pulses with the prescribed timing and amplitude. In the example shown, the PDAC and NDAC comprise current sources, but could comprise voltage sources as well. A PDAC and NDAC pair may be dedicated at each of the electrodes (see, e.g., FIG. 4A), with one of these activated only when its associated electrode is selected as an anode or cathode. See, e.g., U.S. Pat. No. 6,181,969. Alternatively, the current produced by one or more PDACs or NDACs may be distributed to selected electrodes by a switch matrix (not shown). Various examples of DAC circuitry 72 are disclosed in U.S. Pat. Nos. 6,181,969, 8,606,362, 8,620,436, and U.S. Patent Application Publications 2018/0071520 and 2019/0083796.

The PDAC and NDAC along with the intervening tissue Rt complete a circuit between a power supply VH, called the compliance voltage, and ground. The compliance voltage VH is preferably adjustable to an optimal level by a compliance voltage generator block 76 (FIG. 2). Such adjustment may occur by measuring voltage drops across the PDAC (Vp) and NDAC (Vn) circuitry as they are forming a pulse, as described further below. The measured voltage drops can be used to ensure that the compliance voltage VH produced is optimal for the stimulation current being provided—i.e., VH is not too low to be unable to produce the current required for the stimulation, nor too high so as to waste power in the IPG 10. Compliance voltage generator block 76 includes circuitry for boosting a power supply voltage such as the battery voltage, Vbat, to a proper level for VH. Such boost circuitry (some components of which may be located off chip) can include an inductor-based boost converter or a capacitor-based charge pump.

In the example waveform shown in FIG. 3, the pulses provided at the electrodes are biphasic, meaning that each pulse comprises a first phase 94*a* of a first polarity, followed by a second phase 94*b* of an opposite polarity. This is useful as a means of active recovery of charge that may build up on the DC-blocking capacitors 55. Thus, while charge will build up on the capacitors 55 during the first pulse phase 94*a*, the second pulse phase 94*b* will actively recover that charge, particularly if the total amount of charge is equal in each phase (i.e., if the area under the first and second pulse phases are equal). Recovery of excess charge on the DC-blocking capacitors 55 is desirable to ensure that the DAC circuitry 72 will operate as intended: if the charge across the DC-blocking capacitors 55 is not zero at the end of each pulse, such remaining charge may impact formation of subsequent pulses, or other problems may occur.

Some residual charge may remain on the DC-blocking capacitors 55 (or other capacitances in the current path) even after completion of the second phase 94*b* of the biphasic pulse. Passive charge recovery may therefore be employed that does not involve use of active currents driven by the DAC circuitry 72. Passive charge recovery is implemented within the stimulation circuitry block 70, and includes use of passive recovery switches (e.g., transistors) 96(*x*), each connected between one of the electrode nodes (Ex' and Ec') 61*a* and a common reference voltage. This common reference voltage as shown may comprise the voltage, Vbat, of the battery 14 as (FIG. 1C) as shown, but another reference voltage could also be used. A variable resistance can be associated with each of the passive recovery switches 96 to set the rate of passive discharge during periods 98 when the switches are closed. See U.S. Patent Application Publication 2018/0071527 (discussing passive charge recovery).

SUMMARY

A pulse generator, is disclosed, which may comprise: electrode nodes, wherein each of the electrode nodes is configured to be coupled to one of a plurality of electrodes in contact with a patient's tissue; stimulation circuitry comprising a source circuit coupled to a first power supply voltage and configured when activated to produce a first voltage at a first of the electrode nodes, wherein the first voltage is referenced to the first power supply voltage; a sink circuit coupled to a second power supply voltage and configured when activated to produce a second voltage at a second of the electrode nodes, wherein the second voltage is referenced to the second power supply voltage; translator circuitry comprising a single measurement input, wherein the translator circuitry is configured to receive the first voltage at the single measurement input and to convert the first voltage to a third voltage referenced to the second power supply voltage; and detector circuitry configured to assess the second and third voltages.

In one example, the source circuit and the sink circuit comprise current sources, wherein the source circuit and the sink circuit are configured to produce the first and second voltages by producing a constant current. In one example, the first power supply voltage is greater than the second power supply voltage. In one example, the first power supply voltage comprises a compliance voltage, and the second power supply voltage comprises ground. In one example, the translator circuitry is powered by the first and second power supply voltages. In one example, the detector circuitry comprises first comparator circuitry configured to compare the second voltage to at least one first threshold and to output a first signal indicating whether the second voltage is higher or lower than the first threshold, and second comparator circuitry configured to compare the third voltage to at least one second threshold and to output a second signal indicating whether the third voltage is higher or lower than the second threshold. In one example, the at least one first threshold and the at least one second threshold are equal. In one example, the at least one first threshold and the at least one second threshold are different. In one example, the pulse generator further comprises a reference voltage generator configured to generate the at least one first threshold and the at least one second threshold, wherein the at least one first threshold is referenced to the second power supply voltage, and wherein the at least one second threshold is referenced to the second power supply voltage. In one example, the at least one first threshold and the at least one second threshold are adjustable. In one example, the reference voltage generator is powered by a third power supply voltage different from the first and second power supply voltage. In one example, the detector circuitry comprises first window comparator circuitry configured to compare the second voltage to a first threshold and a second threshold defining a first window and to output at least one first signal indicating whether the second voltage is within the first window, and second window comparator circuitry configured to compare the third voltage to a third threshold and a fourth threshold defining a second window and to output at least one second signal indicating whether the third voltage is within the second window. In one example, at least some of the first, second, third, and fourth thresholds are equal. In one example, all of the first, second, third, and fourth thresholds are different from each other. In one example, the pulse generator further comprises a reference voltage generator configured to generate the first, second, third, and fourth thresholds, wherein the first, second, third, and fourth thresholds are referenced to the second power supply voltage. In one example, the first, second, third and fourth thresholds are adjustable. In one example, the reference voltage generator is powered by a third power supply different from the first and second power supply voltages. In one example, the translator circuitry comprises an upper resistance coupled to the first power supply voltage and a lower resistance coupled to the second power supply voltage. In one example, the translator circuitry is configured to form a current through the upper and lower resistances by impressing the first voltage across the upper resistance, wherein the third voltage is formed as a voltage drop across the lower resistance. In one example, a transistor is coupled between the upper and lower resistances. In one example, the translator circuitry comprises a charge pump. In one example, the translator circuitry comprises control inputs receiving at least a first and second clock. In one example, the charge pump comprises a capacitor, wherein the first clock is configured to impress the first voltage across the capacitor, and wherein the second clock is configured to connect a top plate of the capacitor to the first power supply voltage, thereby establishing the third voltage at a lower plate of the capacitor. In one example, the detector circuitry is configured to adjust the first power supply voltage based on the assessment of the second and third voltages. In one example, the detector circuitry is configured to generate a high signal and a low signal for each of the second and third voltages. In one example, the detector circuitry further comprises logic circuitry, wherein the high and low signals are processed at the logic circuitry to determine whether to adjust the first power supply voltage. In one example, the logic circuitry comprises an over-compliance logic block having a first output and configured to receive the high signals for the selected electrode nodes, wherein the over-compliance block applies a first rule to the high signals, wherein the first output is asserted if the first rule is met, and an under-compliance logic block having a second output and configured to receive the low signals for the selected electrode nodes, wherein the under-compliance block applies a second rule to the low signals, wherein the second output is asserted if the second rule is met. In one example, the logic circuitry further comprises a high counter configured to receive the first output, wherein a count of the high counter is incremented when the first output is asserted, and a low counter configured to receive the second output, wherein a count of the low counter is incremented when the second output is asserted. In one example, the logic circuitry further comprises a count threshold block, wherein the logic circuitry is configured to determine to adjust the first power supply voltage if the count of the high counter exceed a first threshold or if the count of the low counter exceeds a second threshold. In one example, the pulse generator further comprises a controller, wherein the detector circuitry is further configured to issue an interrupt to the controller if the logic circuitry determines to adjust the first power supply voltage. In one example, the pulse generator further comprises a compliance voltage generator configured to produce the first power supply voltage, wherein the controller block is further configured to issue a command to the compliance voltage generator to adjust the first power supply voltage in response to receiving the interrupt. In one example, the pulse generator further comprises at least one implantable lead, wherein the electrodes are located on the at least one implantable lead.

A method is disclosed for controlling a first power supply voltage in a pulse generator comprising a plurality of electrode nodes, wherein each of the electrode nodes is configured to be coupled to one of a plurality of electrodes in contact with a patient's tissue. The method may comprise: activating a source circuit coupled to a first power supply voltage to produce a first voltage at a first of the electrode nodes, wherein the first voltage is referenced to the first power supply voltage; simultaneously activating a sink circuit coupled to a second power supply voltage to produce a second voltage at a second of the electrode nodes, wherein the second voltage is referenced to the second power supply voltage; translating only the first voltage but not the second voltage using translator circuitry, wherein translating the first voltage comprises converting the first voltage to a third voltage referenced to the second power supply voltage; and assessing the second and third voltages to adjust the first power supply voltage. Other concepts associated with the pulse generator may also be included as part of this method, although these are not restated here.

BRIEF DESCRIPTION OF THE DRAWINGS

FIGS. 1A-1C show an Implantable Pulse Generator (IPG), and the manner in which an electrode array is coupled to the IPG, in accordance with the prior art.

FIGS. 7F and 7G show further alternative in which any of the voltages used in compliance voltages monitoring and adjustment can be converted to high-side voltages referenced to the compliance voltage if necessary.

DETAILED DESCRIPTION

Before discussing compliance voltage monitoring and adjustment in an IPG system, which are the focus of this disclosure, further details concerning the stimulation circuitry 70 and the current generation circuitry 72 in an IPG are discussed. This is done for completeness, and to show an example implementation in which the compliance voltage management aspects of this disclosure can operate. Note however that implementations of the invention are not limited to the use of any particular stimulation circuitry 70 or current generation circuitry 72.

Figure 4A:
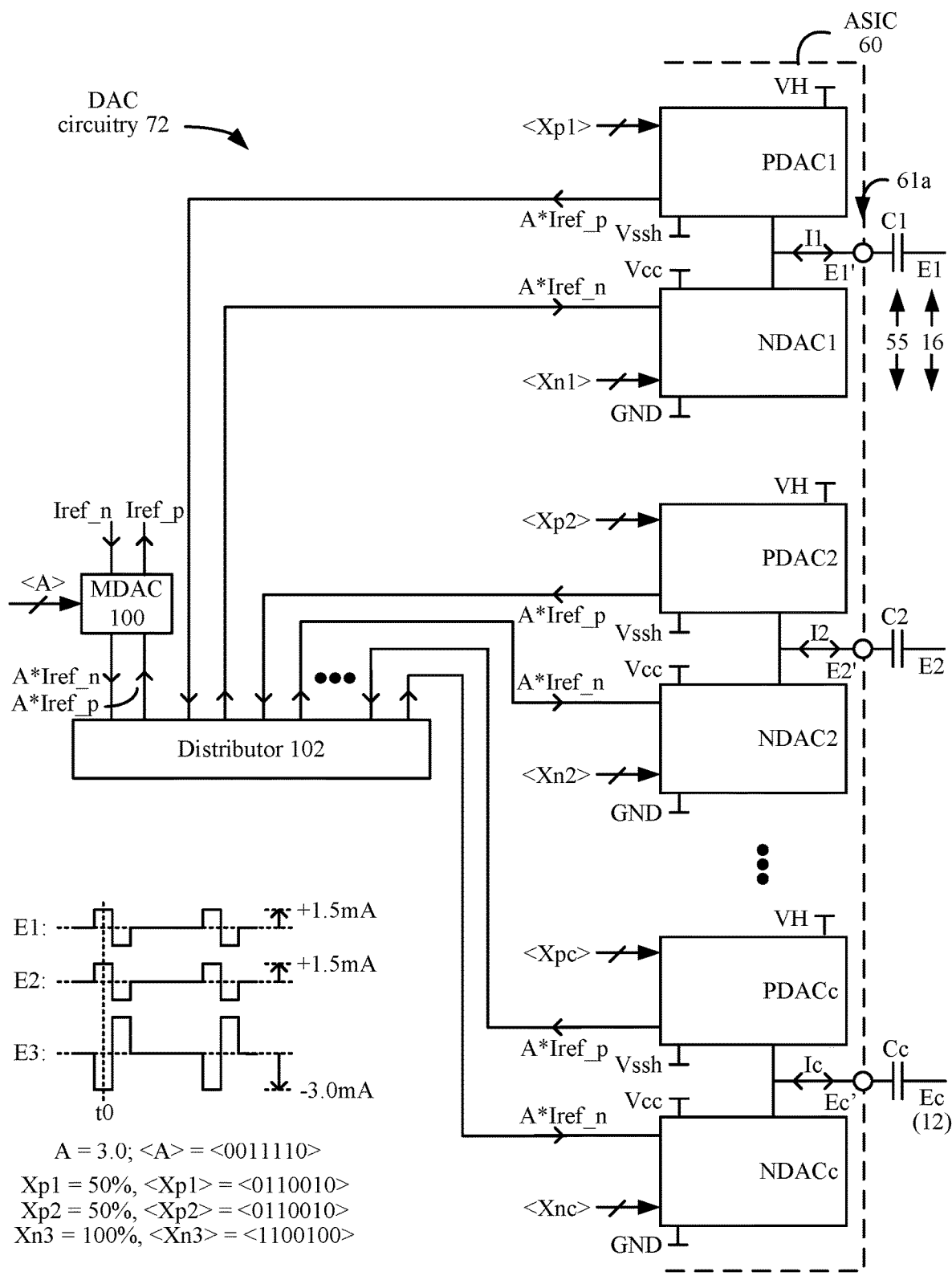
FIGS. 4A-4C show further details of the stimulation circuitry and DAC circuitry.

FIG. 4A shows a simplified version of the current generation circuitry, which may comprise DAC circuitry 72 disclosed in U.S. Patent Application Publication 2019/0083796, with which the reader is assumed familiar. Again, other DAC circuitries such as those mentioned in the Introduction could be used as well. In the example of FIG. 4A, an amplitude A, as reflected in digital control signals <A>, is provided to a master DAC (MDAC) 100. Amplitude A may be specific to a particular timing channel operating in the IPG, as explained further below, and may be indicative of a total anodic and cathodic amplitude to be sourced and sunk during that timing channel at any given time. MDAC 100 receives reference currents Iref_p and Iref_n which are preferably of equal magnitude, but of opposite polarities. The MDAC 100 amplifies these reference currents to provide currents A*Iref_p and A*Iref_n, also of opposite polarities.

Distributor circuitry 102 provides A*Iref_p to various PDACs (PDAC1, PDAC2, etc.), and provides A*Iref_n to various NDACs (NDAC1, NDAC2, etc.). In the example shown, a PDAC/NDAC pair is dedicated to each electrode node. Thus, PDAC1 or NDAC1 can be enabled to source or sink a current I1 to electrode node E1', which is coupled to electrode E1 (e.g., on a lead) via a DC-blocking capacitor C1. PDAC2 and NDAC2 can likewise be enabled to source or sink a current I2 to electrode node E2' and electrode E2 via its DC-blocking capacitor C2. As noted earlier, the conductive case 12 can also operate as an electrode Ec, and thus PDACc and NDACc can likewise be enabled to source or sink a current Ic to electrode node Ec' and to case electrode Ec 12 via DC-blocking capacitor Cc. DAC circuitry 72 could in other examples use PDACs and NDACs that are not dedicated to particular electrode nodes/electrodes as shown. For example, switching matrices (not shown), could be used to connect the outputs of the PDAC/NDAC pairs to any one of the electrode nodes Ex'.

Also received by each PDAC and each NDAC are digital control signals <X> that inform as to the percentage of the total anodic and cathodic amplitude A that each PDAC or NDAC should produce. Thus, PDAC1 receives percentage control signals <Xp1>, NDAC1 receives <Xn1>, PDAC2 receives <Xp2>, and so forth. The waveforms at the bottom of FIG. 4A show an example at time t0 where an anodic pulse of amplitude +1.5 mA is formed at E1 and E2, and a cathodic pulse of amplitude −3.0 mA is formed at E3, and shows examples of the digital control signals that are used to form these pulses. In this example, the total anodic and cathodic current is 3.0 mA, and <A> is thus digitally set to indicate this value; for example, and assuming <A> increments in 0.1 mA steps, <A> can be set at time t0 to 30, or 0011110 in binary. Electrodes E1 and E2 split the anodic current equally, and so Xp1 and Xp2 are set at time t0 to 50%, or 0110010 in binary. Electrode E3 receives all of cathodic current, and so Xn3 is set at time t0 to 100%, or 1100100 in binary. All other percentage control signals (Xn1, Xn2, Xp3, Xn4, Xp4, etc.) would be set to 0% (0000000), indicating that corresponding NDACs and PDACs would not be producing a current at time to.

Figure 3:
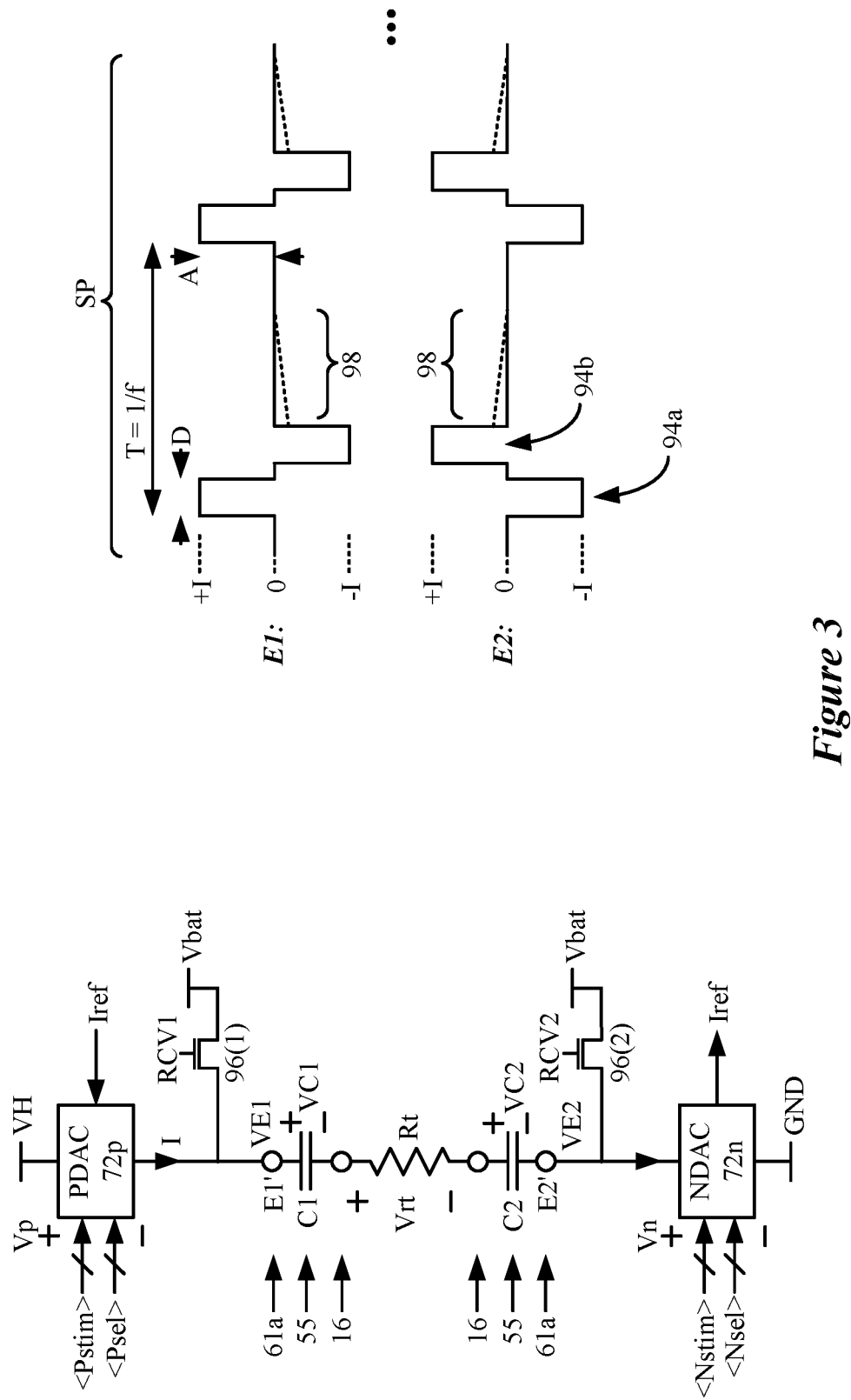
FIG. 3 shows aspects of the Digital-to-Analog Converters (DACs) within the stimulation circuitry of the ASIC, and stimulation pulses formable thereby.
Figure 4B:
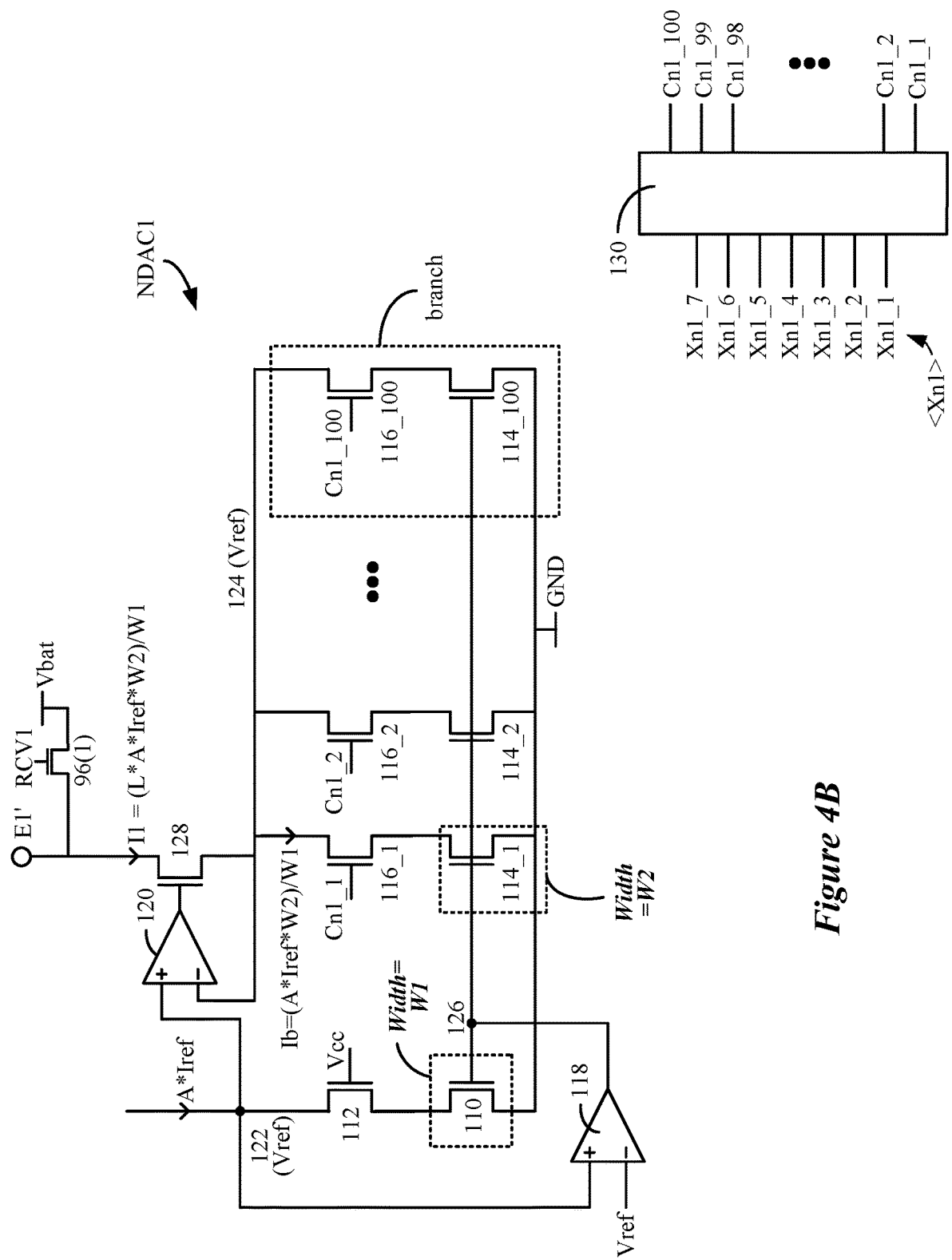

FIG. 4B shows an example of the circuitry of an NDAC (e.g., NDAC1) for providing a cathodic current at an electrode node (e.g., E1'). Other NDACs would be similar. The PDACs, as shown in the '796 Publication, also have similar circuitry, although of opposite polarity due to the anodic currents the PDACs produce. Also shown in FIG. 4B is the passive charge recovery switch 96(1) connected to electrode node E1', which was explained earlier with respect to FIG. 3.

Amplified reference current A*Iref_n (shortened to A*Iref in FIG. 4B) is provided from the distributor 102 to one or more resistance transistors 110 through an always-on switch 112. The NDAC also includes a number of branches (e.g., 100 branches), with each branch having a branch transistor 114_x connected in series to a switch 116_x. As explained in the '796 Publication, using op amps 118 and 120, a reference voltage Vref is maintained across the resistance transistor(s) 110 (at node 122) and each of the branches (at node 124). The resistance of switches 112 and 116_x are negligible, and so Vref is effectively dropped across the resistance transistor(s) 110 and each of the branch transistors 114_x.

Resistance transistor(s) 110 and branch transistors 114_x are not connected in a current mirror configuration, but are on to the same degree due to their common gate connection at node 126. These transistors 110 and 114 are preferably of different widths W1 and W2, with W2 larger than W1, meaning that the resistance of the branch transistors 114 are W2/W1 less than the resistance of the resistance transistor(s) 110. This resistance difference, coupled with the common voltage drop Vref across each, sets the current in each branch, again as explained in detail in the '796 Publication. Resistance transistor(s) 110 receive A*Iref, while each branch x, when selected by its switch 116_x, provides an amplified current of Ib=(A*Iref*W2)/W1. If L=3 branches are selected, for example by turning on switches 116_1, 116_2, and 116_3 via switch control signals Cn1_1, Cn1_2, and Cn1_3, a total current of I1=(3*A*Iref*W2)/W1 is provided to the electrode node E1', and ultimately to electrode E1 via an output transistor 128.

The switch control signals Cn1_x are derived from the percentage control signals <Xn1> via logic circuitry 130. Such logic circuitry 130 is shown only generically in FIG. 4B, but the '796 Publication explains it in more detail. Essentially, logic circuitry 130 acts as a decoder to assert a number of switch control signals Cn1_x in proportion to the percentage reflected in percentage control signals. For example, if the percentage control signals <Xn1>=30 ('001110'), then logic circuitry may assert Cn1_1 through Cn1_30 (or any thirty of the switch control signals). This turns on switch transistors 116_1 through 116_30, which sets the current I1 (i.e., I1=30*Ib=(30*A*Iref*W2)/W1) at electrode node E1'. Note that this conversion of percentage control signals into switch control signals occurs in each of the PDACs and NDACs. Thus, percentage control signals <Xp1> provided to PDAC1 are converted into switch control signals Cp1_x; percentage control signals <Xn2> provided to NDAC2 are converted into switch control signals Cn2_x, and so on.

Figure 4C:
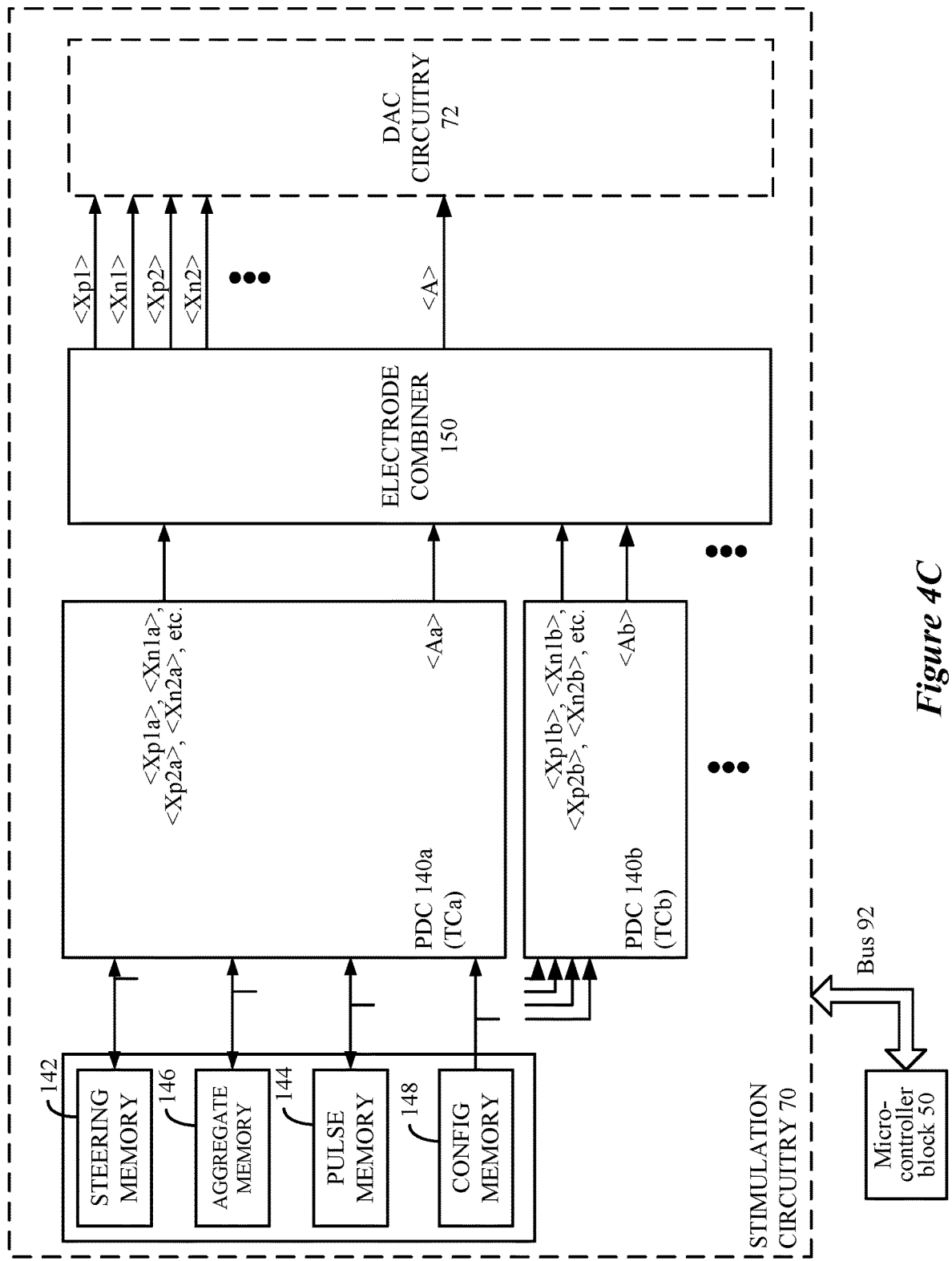

Stimulation circuitry 70 as shown in FIG. 4C shows further details of how relevant control signals such as <A> and <X> arrive at the DAC circuitry 72. The stimulation circuitry 70 includes memory circuitry that stores microcode processed by one or more pulse definition circuits (PDCs) 140. Memory circuitry includes a steering memory 142 that contains electrode steering programs, and a pulse memory 144 that contains pulse programs, both of which are discussed further with respect to FIG. 5B. Memory circuitry also includes an aggregate memory 146 that contains aggregate programs that link or associate one or more pulse programs and one or more steering programs to create a desired stimulation pulse therapy program, as discussed further with respect to FIG. 5C. The stimulation circuitry 70 additionally includes a configuration memory 148 that stores configuration parameters, some of which are global and applied across all PDCs 140, and some of which are specific to a particular PDC 140. The memories 142-148 can be read from and written to by the microcontroller 50 via bus 92. Each location (e.g., each 32-bit location) in the memory circuitry may be formed as a register of multiple flip-flops or as an addressable location in a more typical memory, and may comprise separate memory circuits or a single memory circuit.

In one example, there may be four PDCs, although only two (140a and 140b) are shown in FIG. 4C. Each of the PDCs are used in a normal mode to control the formation of stimulation pulses within a timing channel, such as TCa and TCb. Each timing channel allows pulses to be formed independently and concurrently, thus allowing more complex stimulation patterns to be provided to patients. The total anodic and cathodic current amplitude provided by PDC 140a in TCa is Aa, which amplitude is specified in a given pulse program, as explained shortly. By contrast, the total anodic and cathodic current amplitude provided by PDC 140b in TCb may be different, i.e., Ab. Because the pulses from the different timing channels may overlap in time, an electrode combiner 150 is used to reconcile information concerning what the total anodic and cathodic current amplitude A, and what percentage control switches <X> (and hence which switches 116 in the DACs), should be asserted at any given time. In this regard, the electrode combiner 150 can receive amplitude and percentage information from each PDC 140 (e.g., <Aa>, and <Xp1a>, <Xn1a>, <Xp2a>, etc. from PDC 140a, and <Ab>, and <Xp1b>, <Xn1b>, <Xp2b>, etc. from PDC 140b) to derive a single amplitude <A> and a single set of percentage control switches <Xp1>, <Xn1>, <Xp2>, etc., to be used by the DAC circuitry 72 at any given time.

Figure 5A:
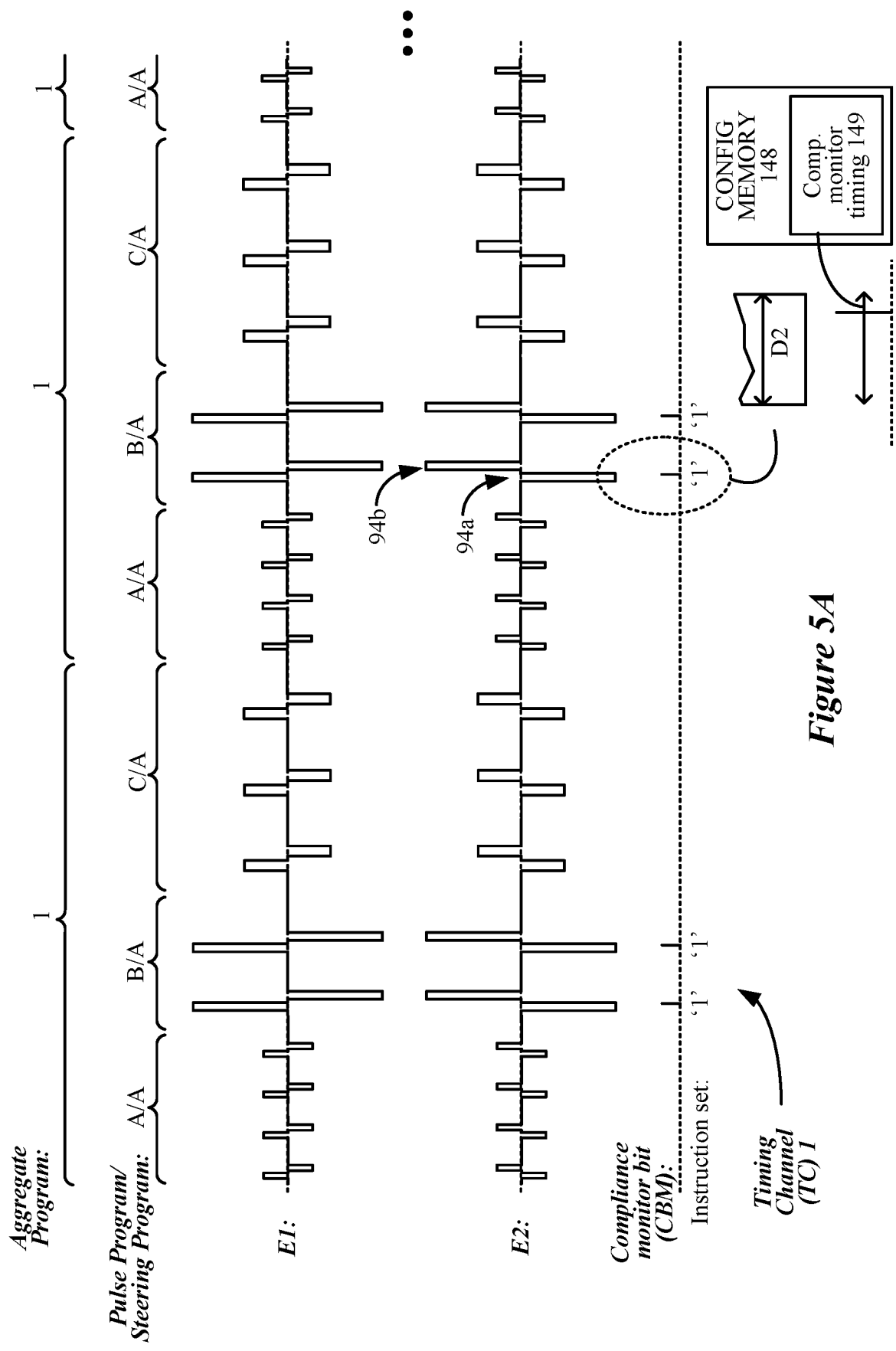
FIG. 5A shows a pulse train issued according to a first aggregate program (FIG. 5C) associating a pulse program and a steering program (FIG. 5B) in a first timing channel A compliance monitoring bit is set to enable a compliance voltage measurement during some of the pulses.
Figure 5B:
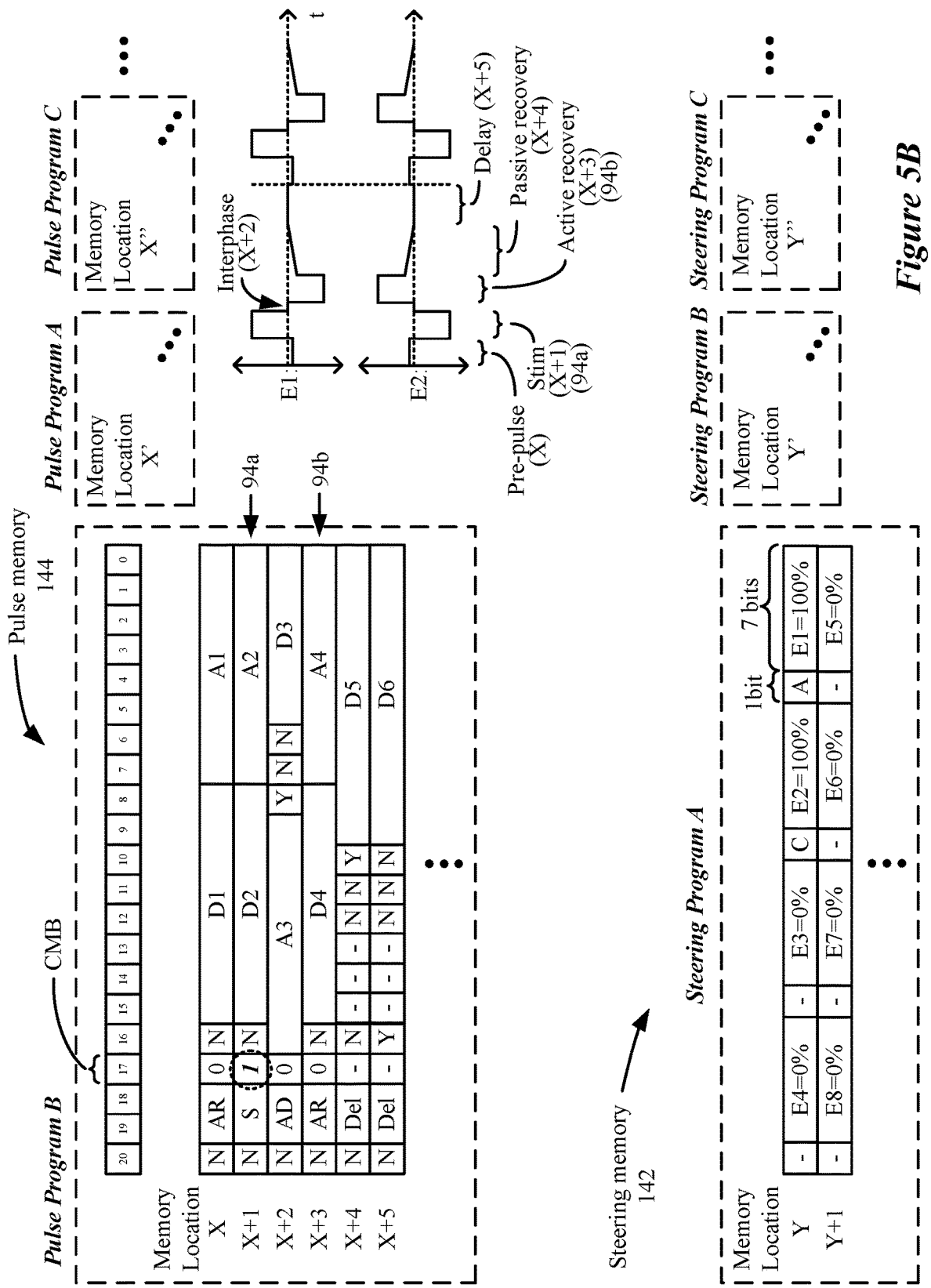

The unique configuration of the stimulation circuitry 70 and DAC circuitry 72 allows for the efficient production of stimulation waveforms of unique and varying shapes. FIG. 5A shows an example of a waveform that can be produced in a particular timing channel (e.g., TCa, using PDAC 140a). In this example, two electrodes E1 and E2 have been selected for stimulation, which occurs by selection of a particular steering program A in steering memory 142, as shown in FIG. 5B. A steering program generally informs as to which electrodes are to receive pulses, the polarity of the pulses at those electrodes, and a percentage (X) of the total anodic and cathodic amplitude for the pulses at those electrodes. Steering program A may be stored starting at memory location Y, with each location storing data for four of the electrodes (e.g., electrodes E1-E4). One quarter of each location (8 bits) stores the data for a particular electrode, including a bit indicating whether the electrode is to comprise an anode ('1') or cathode ('0'), and up to seven bits indicating a percentage of the anodic or cathodic current that that electrode is to receive (<X>). Pursuant to the example of FIG. 5A, notice in FIG. 5B that memory location Y specifies that electrode E1 has been designated an anode (A='1'), which receives 100% of the total anodic current (i.e., <Xp1>=100%), and electrode E2 has been designated an anode (C='0'), which receives 100% of the total cathodic current (i.e., <Xn2>=100%). (As explained below, the associated pulse program includes information which reverses these polarities at appropriate times for a biphasic pulse). Electrodes E3 and E4, which are not used in this example, receive 0% of the total current, making their polarities irrelevant, and the same would be true for the remaining electrodes in subsequent memory locations (e.g., next memory location Y+1 storing data for electrodes E5-E8 would also have 0%, etc.).

Multiple steering programs can be stored in steering memory 142 (e.g., steering program B starting at memory location Y'; steering program C starting at memory location Y"), each designating different one or more electrodes to operate as anodes and one or more electrodes to operate as cathodes, and a percentage of the total anodic and cathodic current such electrodes will receive. Note that the percentages for the anode electrodes in a given a steering program would normally sum to 100%, and the percentages for the cathode electrodes in that steering program would normally sum to 100%, thus ensuring that the same total anodic current (+A) and the total cathodic current (−A) is prescribed at any given time, which prevents a net injection of charge into the patient's tissue.

Also shown in FIG. 5B are a number of pulse programs stored in pulse memory 144. Pulse programs specify the basic shape of a pulse, including an amplitude (A) and duration (D) of its various phases. Example pulse program B is shown as starting at memory location X, with each successive location including data for a successive phase in the pulse. Only 20 of the 32 available bits may be used at each location to define the pulse phases. Bits 19 and 18 specify a type of pulse phase, which dictates the format of the remaining bits in that memory location. For example, pulse phase types may comprise active stimulation phases, delay phases which don't involve active generation of currents, and passive charge recovery phases dictating when passive charge recovery switches (96(x), FIG. 3) should be closed. The reader can refer to the above-incorporated '513 Publication for a more complete discussion of the types of pulse phases and the various bits that are stored with each.

In the example of FIG. 5B, pulse program B defines a biphasic pulse having six phases, as shown in FIG. 5B's waveform. The first phase (memory location X) comprises an actively-driven pre-pulse phase, which may be of low amplitude A1 and a short duration D1. It is designated as an active-driven recovery phase (AR), which operates to flip the polarity of the electrodes otherwise specified by the steering program. Thus, assuming pulse program B is associated with steering program A, E1 would comprise a cathode and E2 an anode during this pulse phase, as shown in the waveforms. The second phase (location X+1) comprises an actively-driven stimulation phase (S) of amplitude A2 and duration D2, and generally corresponds to the first pulse phase 94a described earlier (FIG. 3). The polarities are not flipped for this pulse phase type, and so E1 would comprise an anode and E2 a cathode during this pulse phase. The third phase (location X+2) comprises an interphase, amounting to a delay between the first and second pulses phases 94a and 94b. This interphase is designated as "AD," meaning an active delay, which keeps the DAC circuitry 72 powered in preparation for driving a subsequent stimulation or active recovery phase. During this interphase, the amplitude A3 would normally be set to zero, and the interphase would generally have a short duration D3. The fourth phase (location X+3) comprises an active recovery phase (AR), and generally corresponds to second pulse phase 94b (FIG. 3). This phase will actively recover charge injected primarily during the stimulation phase, and therefore will have a significant amplitude A4 and/or duration D4. Again, the polarity of the electrodes specified by the steering program will flip during this phase. The fifth phase (location X+4) comprises a delay phase ("Del"), and because a passive recovery bit (bit 10) is set, passive recovery will occur during duration D5 by closing relevant ones of the passive charge recovery switches (96(x), FIG. 3). The sixth phase (location X+5) also comprises a delay phase of duration D6, but without passive charge recovery. This phase essentially comprises a dead period that will occur before the next pulse—i.e., the first phase of the next pulse. Note as consistent with their function, delay phase types do require specifying an amplitude, because the DAC circuitry 72 does not actively drive a current during these phase types. Bit 16 is set to inform that this is the last phase in the pulse. Note that the sum total of the phase durations (D1, D2, etc.) defines a pulse period (T), which determines the frequency (f=1/T) at which the pulses issue.

It should be appreciated using this architecture that pulses of unique shapes, and having many different phases, can be specified in a given pulse program. The '513 Publication explains that sine wave pulses, ramped pulses, and even pulses of random shapes, can be easily defined by concatenating different pulse phase types in the pulse program. For example, although not shown, a pulse program may comprise a number of successive stimulation phases (S) of increasing amplitudes, which would create a pulse with a rising stair-stepped shape.

Figure 5C:
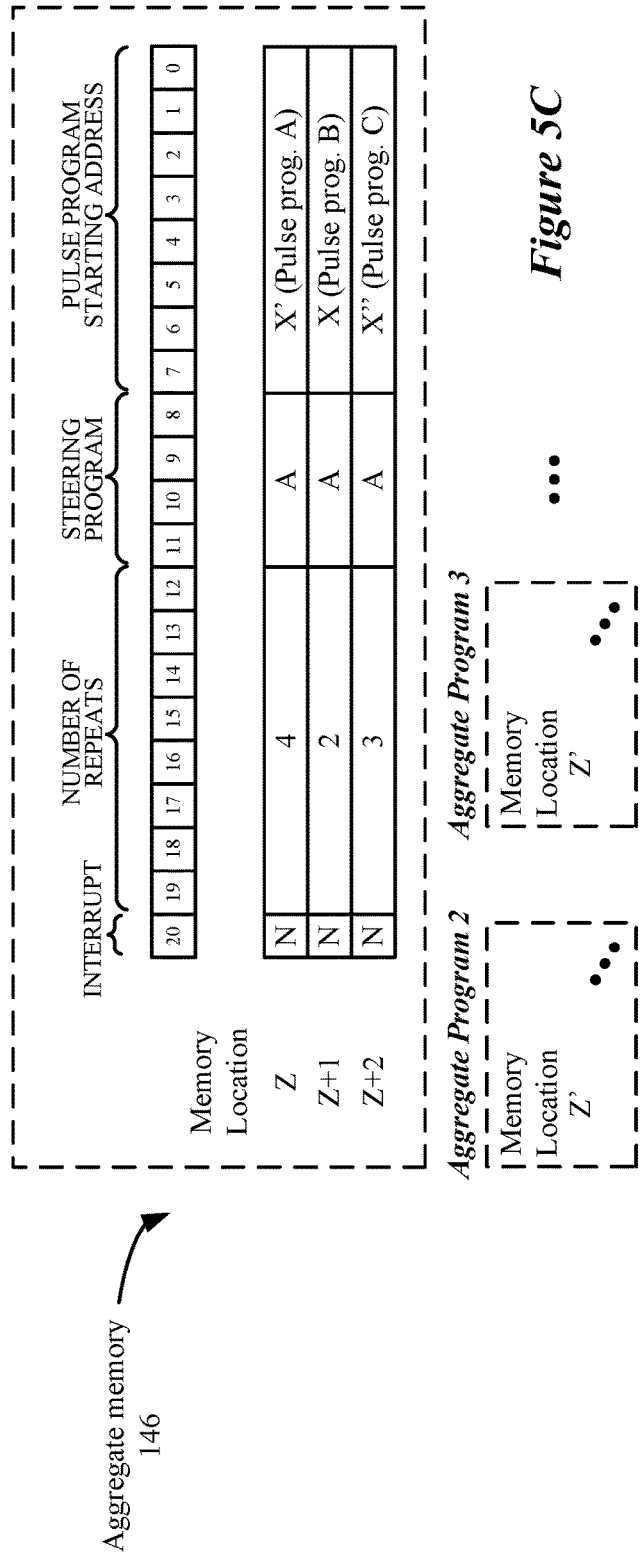

Any pulse program in memory 144 may be associated with any steering program in memory 142 to create pulses defined by the pulse program at the electrodes defined in the steering program, and this occurs by use of an aggregate program stored in aggregate memory 146, as shown in FIG. 5C. Each memory location of the aggregate program comprises an aggregate instruction that is formatted to associate a steering program with a pulse program, which can occur by specifying a particular steering program and the starting address of a pulse program. Further, each aggregate instruction specifies a number of times a pulse (including its various phases as specified in the pulse program) will repeat. Successive memory locations can define other aggregate instructions, specifying different pulse program/steering program associations and different pulse repeat numbers.

FIG. 5A shows the waveform formed using the aggregate program 1 of FIG. 5C. Three pulse programs A, B, and C are successively specified using three aggregate instructions in aggregate program 1, whose pulses are repeated 4, 2, and 3 times respectively. Notice in this example that the amplitudes specified in pulse programs A, B, and C are different, as are the durations of the pulse phases and the frequencies with which the pulses are issued. The same steering program A (FIG. 5B) is associated with each pulse program in aggregate program 1, specifying use of electrode E1 and as anode, and E2 as a cathode (although again these polarities can be flipped in accordance with the pulse phase type specified in the pulse program). Notice that the aggregate program 1 can be executed such that it repeats, as shown in FIG. 5A. Although not shown, this can be affected by defining the start (Z) and end (Z+2) memory location in the configuration memory 148 (FIG. 4A), or in the starting and ending aggregate instructions themselves.

While stimulation circuitry 70 and DAC circuitry 72 are beneficial in their ability to efficiently form and concatenate stimulation pulses of different shapes, the inventors realize that such flexibility gives rise to new challenges, in particular as concerns management of the compliance voltage, VH. As discussed earlier, adjustment of the compliance voltage VH is desirable to ensure that stimulation pulses can be reliably formed without wasting power (the battery 14) in the IPG 10.

But compliance voltage management is made difficult when the amplitude of pulses can be quickly and significantly altered, as occurs in the example of FIG. 5A. Compliance voltage measurements—such as the voltage drops across the PDAC (Vp) and NDAC (Vn) (FIG. 3)—could be taken during every stimulation pulse to asses—compliance voltage sufficiency and to decide how the compliance voltage should be adjusted. But this would be difficult to manage and implement. For example, suppose measurements taken during pulse program A—when the pulse amplitudes are low—indicate that the compliance voltage VH is not too high or too low. When the first high-amplitude stimulation pulse of pulse program B issues, the compliance voltage may likely be too low, and therefore pulse program B's pulses may not issue with the prescribed amplitudes. In short, the therapy specified by the aggregate program 1 may not be reliably issued to the patient.

This issue is addressed by providing in software the ability to specify which stimulation pulses are to be measured as relevant to monitoring and adjusting the compliance voltage. Preferably, specifying such pulses occurs by setting a compliance monitor bit in the program that defines the pulse, and more particularly the compliance monitor bit may be set at a memory location defining a particular pulse phase during which the compliance voltage should be monitored. When a compliance monitor bit is issued, the active electrode node voltages are monitored and compared to desired ranges to determine whether they are high or low. Compliance logic operates on these high/low signals and processes them to decide whether to issue a compliance voltage interrupt to the microcontroller, which can then instruct the compliance voltage generator to increase or decrease the compliance voltage.

Defining in software which pulses (or more generally, pulse phases) are to be measured as relevant to compliance voltage monitoring and adjustment preferably occurs by inclusion of compliance voltage monitoring data, which may comprise a single compliance monitoring bit (CMB), although longer data structures could be used as well. As shown in FIG. 5B, and preferably, such compliance monitoring bit may be defined in the format of certain pulse phase types in a pulse program. For example, bit 17 comprises a compliance monitor bit in certain active and delay pulse phase types, thus allowing compliance measurements to be taken during such pulse phases if desired.

The compliance monitoring bit can be set with an instruction or not, and as explained further below, the instruction is configured to instruct the compliance circuitry to process the voltages at the selected electrode nodes during the relevant pulse phase with which the instruction is stored. For example, in the example timing channel TCa of FIG. 5A, notice that the compliance monitoring bit has only been set with an instruction (a logic state '1') for the high amplitude pulses used in pulse program B, but has not been set with an instruction (logic state '0') not for the smaller pulses in pulse programs A and C. Specifically, the compliance monitoring bit is set only during the first pulse phase 94a of the pulses in pulse program B, which bit is circled in FIG. 5B.

The disclosed architecture also allows the timing of the issuance of the compliance monitoring bit instruction to be defined, which is important because the issuance of this bit sets the timing at which measurements relevant to the compliance voltage are made. The timing of the compliance monitoring bit instruction is shown in the magnified view at the bottom right of FIG. 5A, which timing in this example is set using the configuration memory 148 (FIG. 4C). Within this memory 148 is a compliance monitor timing register 149, which defines when the compliance monitoring bit instruction will issue during the duration of the pulse phase in which it is set. Such timing may be defined in a number of ways. For example, the compliance monitor timing register 149 may specify a percentage during the duration (e.g., D2) of the pulse phase during which the compliance monitoring bit instruction issues, with 1% specifying issuance of the bit at the beginning of the duration, and 99% specifying issuance at the end of the duration. Alternatively, register 149 can store a time offset (e.g., 1 µs) from either the beginning or end of the pulse phase at which the CMB instruction will issue. Such time offset can be quantified by other measures of time, such as a number of cycles of a clock operating with the ASIC 60. Compliance monitor bit instruction timing could also occur after the pulse phase in other examples.

It is preferred to set the timing of the issuance of the compliance monitoring bit instruction to when the compliance voltage VH is most likely to be inadequate. In the example shown in FIG. 5A, this occurs just before the end of the first pulse phase 94a. This is the worst case for a biphasic pulses: at the end of the first pulse phase, the DC-blocking capacitors 55 (FIG. 3) will be charged to their maximum extent, and thus the voltage across them (VC1, VC2) will be at their highest. This minimizes the voltage drops across the PDAC and NDAC (Vp, Vn) for the same compliance voltage, VH, meaning that the PDAC and NDAC are at risk for having too little power to produce pulses of prescribed amplitudes. In other words, VH is mostly likely too low at this point, and hence it is important to take a compliance voltage measurement at this point to verify compliance voltage adequacy.

To summarize, compliance voltage measurements are preferably taken at times when the compliance voltage VH might be expected to be most inadequate. This allows the compliance voltage to be set at a level that is high enough to reliably form the high amplitude pulses (during pulse program B). Smaller amplitude pulses (during pulse programs A and C) can be ignored during compliance monitoring (the CBM bits are not set to '0', and hence no compliance monitoring instruction). The established compliance voltage will be higher than necessary to form these smaller pulses. This wastes power in the creation of these smaller pulses, but is a reasonable trade off, as it ensures that an adequate compliance voltage will be formed for all pulses, and that minimal compliance measurements and adjustment will need to be made.

Compliance monitoring instructions can be set in different ways. For example, compliance monitor bits could be set to '1' by a user writing the pulse program or the aggregate program which calls it to provide therapy to a patient. This would most likely be done with the assistance of an external clinician programmer computer system, which would allow the clinician to set the compliance monitor bits (and/or write the pulse and aggregate programs), and wirelessly transmit the program(s) to the memory circuitry in the IPG 10. See, e.g., U.S. Patent Application Publication 2015/0360038 (disclosing a clinician programmer for setting or adjusting a patient's stimulation therapy). A compliance monitor bit may also be set automatically by the IPG 10 or the external programmer software. For example, the stimulation circuitry 70 in the IPG 10 may realize that a particular aggregate program has certain particularly high amplitude pulses, and may set the compliance monitor bit with instructions for those pulses. In this regard, note that the compliance monitoring instructions can be defined in data structures other than the pulse programs depicted in FIG. 5B.

Figure 6A:
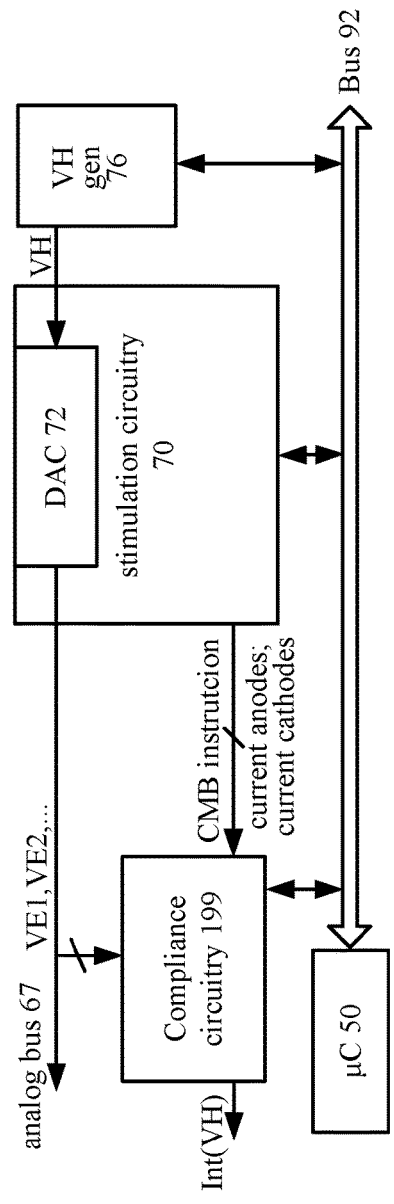
FIG. 6A shows inclusion of a compliance detector within the ASIC.

FIG. 6A shows further details concerning integration of compliance voltage monitoring and adjustment in ASIC 60.

Figure 6B:
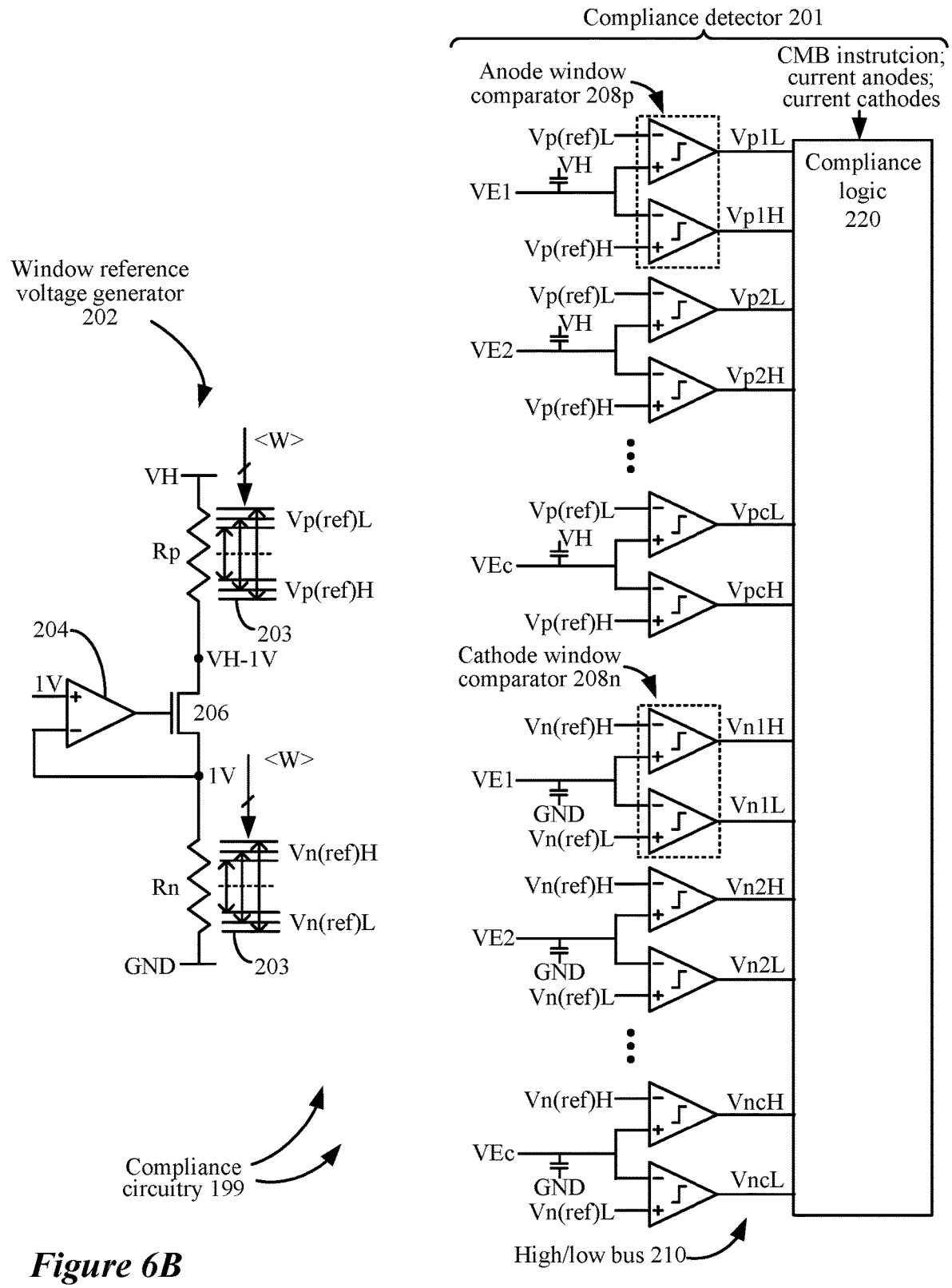
FIGS. 6B-6D show details of the compliance detector.
Figure 6C:
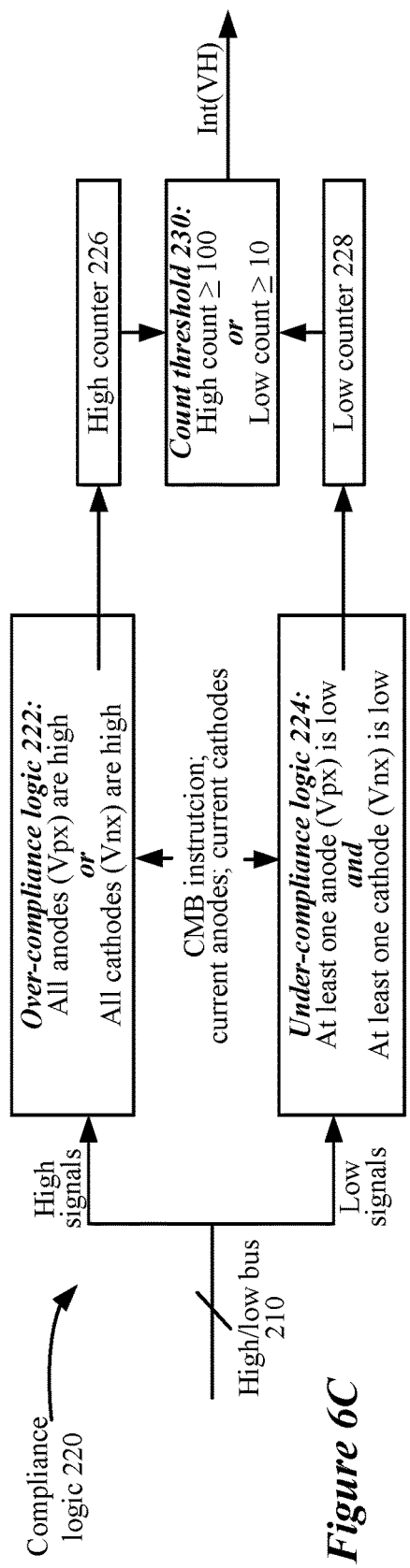
Figure 6D:
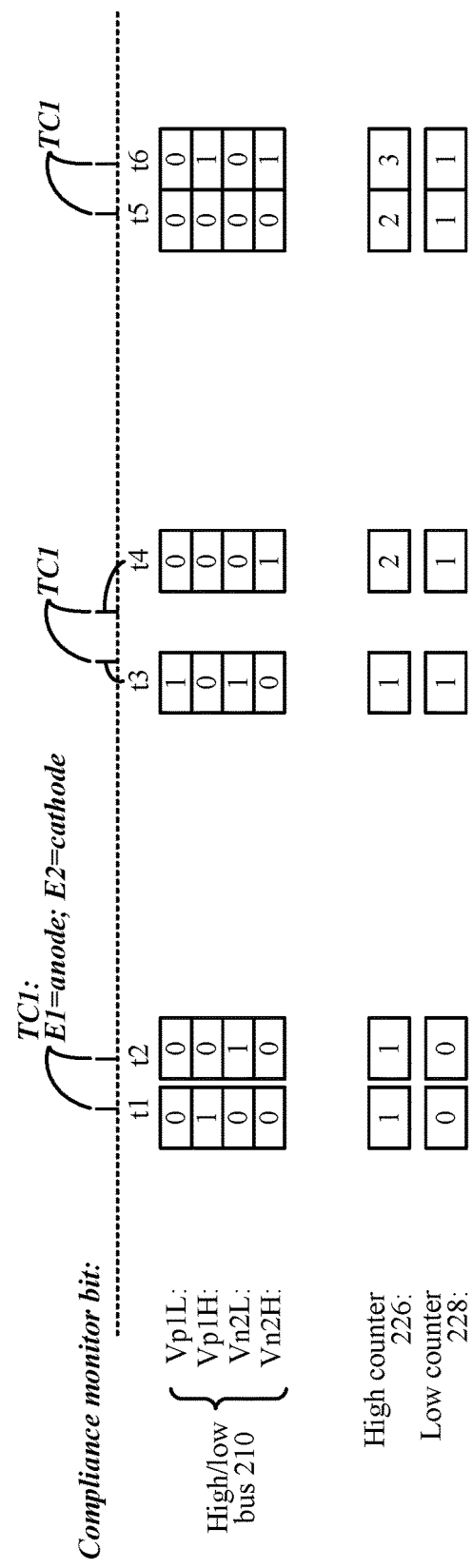

As shown, the voltage at the electrodes nodes 61a (VE1, VE2, etc.) are reported along analog bus 67 from the DAC circuitry 72 to compliance circuitry 199 as depicted in further detail with respect to FIGS. 6B-6D. Circuitry 199 also receives the compliance monitor bits instructions with the appropriate timing from the stimulation circuitry 70 when it is executing an aggregate program and providing stimulation pulses to the patient. The stimulation circuitry 70 further provides to compliance circuitry 199 information regarding which electrodes are currently—during the pulse phase in which the compliance monitor bit is specified— acting as anodes and cathodes. This allows the circuitry 199 to understand which electrode node voltages are relevant to monitor when a compliance monitoring bit instruction issues, as explained further below. If compliance circuitry 199 determines from the compliance voltage measurements that the compliance voltage VH is too high or too low, it can issue a compliance voltage interrupt (Int(VH)) to the microcontroller block 50, which can in turn take certain actions as discussed in further detail with respect to FIGS. 8A-8C. Note that interrupt Int(VH) can be communicated to the microcontroller block 50 either via the internal bus 92, or directly and independently of the bus.

FIG. 6B shows further details of the compliance circuitry 199, which includes a compliance detector 201 and a window reference voltage generator 202. The compliance detector 201 further includes compliance logic which is explained further with reference to FIGS. 6C and 6D. The compliance detector 201 effectively determines the voltage drops across the active PDAC and NDAC circuitry, akin to Vp and Vn as shown in FIG. 3, although such voltage drops may not be directly measured by compliance detector circuitry 201 (although they could be). Instead, and as shown below, these voltage drops are inferred by assessing the voltages at the active electrode nodes 61a, VEi, and comparing them to various reference values to determine whether they are high or low—and hence whether the voltage drops Vp or Vn across the PDACs or NDACs are high or low.

The compliance detector 201 receives the electrode node voltages VEi and inputs each into an anode window comparator 208p and a cathode window comparator 208n. This is desired because at any given time a particular electrode node Ei' may be programmed to operate as an anode or cathode, depending on whether the PDAC and NDAC connected to that node is active. Referring again to FIG. 3, we see that when an electrode node (e.g., E2') is currently acting as a cathode, its voltage (VE2) is referenced to ground, and equals the voltage drop across the NDAC (VE2=Vn). By contrast, when an electrode node (e.g., E1') is currently acting as an anode, its voltage (VE1) is referenced to the compliance voltage VH, and is a function of both the drop across the PDAC (Vp) and VH (VE2=VH−Vp). As such, the anode electrode node voltages are generally quite high, and will vary as VH varies, as explained further below.

The anode window comparators 208p and cathode window comparators 208n each receive high and low reference voltages useful to determining when a given electrode node VEi is too low or too high. These reference voltages are formed by a window reference voltage generator 202 as shown in FIG. 6B. Generator 202 comprises an op amp 204, which receives a reference voltage, such as a 1V, and which outputs to a transistor 206. An upper resistance Rp is connected between the compliance voltage VH and one terminal of the transistor 206, and a lower resistance Rn is connected between ground and the other terminal the transistor 206. Feedback establishes the reference voltage (1V) across the lower resistor, Rn, and because Rp=Rn, the reference voltage is also dropped across the upper resistor Rp.

The upper and lower resistances Rp and Rn comprise a number of taps 203, which taps can be selected via bus <W> to adjust the reference voltages Vp(ref)H and Vp(ref)L used by the anode window comparators 208p, and to adjust the reference voltages Vn(ref)H and Vn(ref)L used by the cathode window comparators 208n. Note that reference voltages Vn(ref)H and Vn(ref)L are referenced to ground, with Vn(ref)H being larger than Vn(ref)L. Reference voltages Vp(ref)H and Vp(ref)L are referenced to VH, with Vp(ref)H being smaller than Vn(ref)L. Like the anode electrode node voltages, Vp(ref)H being smaller than Vn(ref)L are generally quite high, and will vary as VH varies.

Selecting various taps 203 effectively sets a window for optimal values for the voltage drops Vp and Vn across the active PDAC and NDAC. For example, assume via selection of the taps 203 that Vn(ref)H=0.6V and Vn(ref)L=0.4V, and Vp(ref)H is VH−0.7V and Vp(ref)L is VH−0.5 V. This establishes a maximum/minimum for Vn of 0.6V/0.4V, and a maximum/minimum for Vp of 0.7V/0.5 V, with each having a width of 0.2 V. If the electrode voltages are outside of this range, either a high or low signal will be asserted from the window comparators 208p and 208n and reported to compliance logic 220. For example, VE2 from cathode electrode E2 is higher than 0.6V, Vn2H is asserted, meaning that Vn dropped across the active NDAC is too high. This might warrant (depending on the particulars of compliance logic 220) reducing the compliance voltage VH to save power. If VE2 is lower than 0.4V, Vn2L is asserted, meaning that the Vn drop is too low. This might warrant (again, depending on compliance logic 220) increasing the compliance voltage to ensure that pulses are formed with their prescribed amplitudes. Similarly, if VE1 from anode electrode E1 is lower than VH−0.7V, Vp1H is asserted, meaning that Vp dropped across the active PDAC is too high. This might warrant (depending on the compliance logic 220) reducing the compliance voltage to save power. If VE1 is higher than VH−0.5V, Vp1L is asserted, meaning that the Vp drop is too low. This might warrant (again, depending on compliance logic 220) increasing the compliance voltage to ensure that pulses are formed with their prescribed amplitudes.

Thus, the window comparators 208 can establish four digital signals for each electrode node voltage (e.g., VE1), two of which are relevant when the electrode node is acting as a cathode (Vn1H, Vn1L), and two of which are relevant when the electrode node is acting as an anode (e.g., Vp1H, Vp1L). Together, these four signals for all of the electrodes comprise a high/low bus 210 received by the compliance logic 220. Although not shown, realize that the each of the anode electrode voltages could be compared to a single reference voltage (Vp(ref)) at a single comparator, with that comparator outputting a signal indicating whether the anode electrode voltage is high ('1') or low ('0') relative to that reference voltage. Likewise, each of the cathode electrode voltages could be compared to a single reference voltage (Vn(ref)) at a single comparator, with that comparator also outputting a signal indicating whether the cathode electrode voltage is high or low. In short, it is not strictly necessary that window comparators be used.

As shown in FIGS. 6B and 6C, the compliance logic 220 receives the compliance monitor bits instructions when issued, and further receives information regarding which electrodes are currently acting as anodes and cathodes. This allows compliance logic 220 to know when to sample the signals on the high/low bus 210, and which of those signals are relevant at any given time. For example, if E1 is acting as an anode and E2 as a cathode when a compliance monitor instruction is received, compliance logic 220 will assess Vp1L and Vp1H (but not Vn1L or Vn1H), and will assess Vn2L and Vn2H (but not Vp2L or Vp2H).

The compliance logic 220 is shown in detail in FIG. 6C, and as just mentioned, it receives the signals on the high/low bus 210 indicating whether particular electrode node voltages are high, low, or neither at the moment. Essentially, the compliance logic 220 employs an algorithm to decide when the compliance voltage, VH, may need adjustment, and issues interrupt Int(VH) to the microcontroller 50 as stated above. As discussed in detail below, the compliance logic's algorithm employs sophistication to issue the interrupt sensibly, and preferably doesn't issue the interrupt whenever a single high or low signal is issued on the high/low bus 210.

As FIG. 6C shows, the high/low signals on bus 210 are processed by two different logic blocks: an over-compliance logic block 222 and an under-compliance logic block 224. When a compliance monitor bit (CMB) instruction issues, logic blocks 222 and 224 sample the high/low signals corresponding to the currently active anodes and cathodes, and employ rules to decide whether to increments counters 226 and 228. If all anodes are high, or if all cathodes are high, then the over-compliance logic block 222 increments a high counter 226. By contrast, if at least one anode is low and at least one cathode is low, then the under-compliance logic block 224 increments a low counter 228. The rationale for the rules employed by the logic blocks 222 and 224 relate to the interdependence of the PDAC and NDAC circuitry in forming pulses. In any event, other rules could operate within the logic blocks 222 and 224.

FIG. 6D shows an example explaining operation of the logic blocks 224 and 224 and counters 226 and 228. Compliance monitoring bits are issued at various times which correspond to the compliance monitor bits established in timing channel TCa of FIG. 5A. The table shows relevant high/low signals from bus 210. Because TCa only involves electrode node E1 as an anode and E2 as a cathode, only high/low signals Vp1H, Vp1L, Vn2H, and Vn2L are relevant and considered by the logic blocks 222 and 224 when the CMB instructions issue.

At time t1, a CMB instruction issues in TCa, and the voltage at anode E1 is high (Vp1H='1'). E1 is the only anode active at the time, and hence all anodes are high, meeting over-compliance block 222's rule, and thus incrementing high counter 226.

At time t2, a CMB instruction issues in TCa, and the voltage at cathode E2 is low (Vn2L='1'). But no anodes (E1) are low. This does not meet under-compliance block 224's rule, and thus low counter 228 is not incremented.

At time t3, a CMB instruction issues in TCa, and the voltage at anode E1 is low (Vp1L='1') and the voltage at cathode E2 is low (Vn2L='1'). This meets under-compliance block 224's rule, and thus low counter 228 is incremented.

At time t4, a CMB instruction issues in TCa, and the voltage at cathode E2 is high (Vn2H='1'). E2 is the only cathode active at the time, and hence all cathodes are high, meeting over-compliance block 222's rule, and thus incrementing high counter 226.

At time t5, a CMB instruction issues in TCa, and the voltages at anode E1 and cathode E2 are neither high nor low (all='0'). Hence, neither block 222 nor block 224's rules are met, and neither of counters 226 and 228 are incremented.

At time t6, a CMB instruction issues in TCa, and the voltages at anode E1 and cathode E2 are high (Vp1H=V2 nH='1'). This meets over-compliance block 222's rule (for two reasons), and thus high counter 226 is incremented.

FIG. 6D doesn't likely represent an actual use, because an IPG 10 would not ordinarily experience such frequent changes in the high/low signals on bus 210. Nonetheless, FIG. 6D does show how various combinations of high/low signals would be processed by the compliance logic 220. U.S. Pat. No. 10,525,252, which is incorporated herein by reference in its entirety, provides a more complicated example of the operation of compliance logic when pulses are issued in two different timing channels.

Returning to FIG. 6C, the counts accumulating in the counters 226 and 228 are reported to a count threshold logic block 230. In block 230, the count in either of the counters 226 and 228 must meet or exceed a threshold value before the compliance logic 220 will issue the interrupt Int(VH) to the microcontroller 50. This is desired to keep from needlessly over-correcting the compliance voltage. It would be expected during operation of the IPG that some pulses will from time to time not issue perfectly due to noise or other factors. Such spurious occasions preferably should not by themselves give rise to an interrupt, even if they meet the rules of over- and under-compliance logic blocks 222 and 224 and cause high or low counters 226 or 228 to increment. Instead, a number of high or low counts is required to ensure that the compliance voltage is truly too high or too low, and therefore that it is worthwhile to interrupt the microcontroller 50 so that it may take action, as described subsequently.

In count threshold logic block 230, the high count threshold and the low count threshold need not be equal. Instead, in one example, the high count threshold is set to 100, meaning that the high counter 226 must equal 100 or greater before the interrupt Int(VH) is issued; whereas the low count threshold is set to 10, meaning that the low counter 228 must equal 10 or greater before the interrupt Int(VH) is issued. This difference in high and low thresholds is preferred because a compliance voltage that is too high may be considered less problematic than a compliance voltage that is too low: if the compliance voltage is too high, power may be wasted, but stimulation pulses will still be reliably issued; if the compliance voltage is too low, at least some stimulation pulses may be issued with amplitudes that are too small, hence affecting therapy. Having said this, a single threshold value in other designs could be used and applied to both high and low counts.

If the compliance logic 220 has a count that exceeds a threshold—whether high or low—the interrupt Int(VH) issues as mentioned previously. It is worth noting that to this point the disclosed technique for monitoring the compliance voltage doesn't require any assistance from the microcontroller 50. The CMB instructions are set in the memory in the stimulation circuitry 70 and automatically issued to the compliance logic 220; and the compliance detector 201 and compliance logic 220 can otherwise operate by themselves without microcontroller 50 assistance. This offloading of functionality from the microcontroller 50 simplifies system management. Further, this technique is considerate of IPG 10 power, because—from the standpoint of compliance voltage management—the microcontroller 50 is only awoken to take action when it receives an interrupt; the microcontroller 50 may otherwise remain in a low-power sleep state.

Modifications to the compliance circuitry 199 are possible. In this regard, the inventors have noticed that sensing of the electrode node voltages VEi could be made simpler if these voltages were always referenced to ground. This is a particular concern when an electrode node (e.g., VE1) is being used as an anode. As noted earlier, the voltage at anode electrode nodes (VEi) will be referenced to the compliance voltage VH through the PDAC (VEi=VH−Vp). These voltages are therefore generally quite high and further will change as VH changes per operation of the compliance logic 220 (FIG. 6B). Similarly, the reference voltages used by the anode window comparators 208p (Vp(ref)H and Vp(ref)L) are also referenced to the compliance voltage VH by the reference voltage generator 202 (FIG. 6B), and again are quite high and will change as VH changes. In other words, the inputs to the anode window comparators 208p (VEi, and the reference voltages) are high and changing. Such "high-side" sensing creates design challenges, and in particular requires either special biasing or design of the circuitry used to form the anode window comparators 208p, as well as translation of their outputs (on high/low bus 210) down to normal logic levels. It would be preferred if the anode electrode voltages could be sensed similarly to the cathode electrode nodes, with all relevant voltages reference to ground. Such "low-side" sensing would allow the anode window comparators 208p to be designed similarly to the cathode window comparators 208n. These low-side signals and circuitry would be simpler to process and design, because high voltage considerations aren't required.

Figures 7A, 7B:
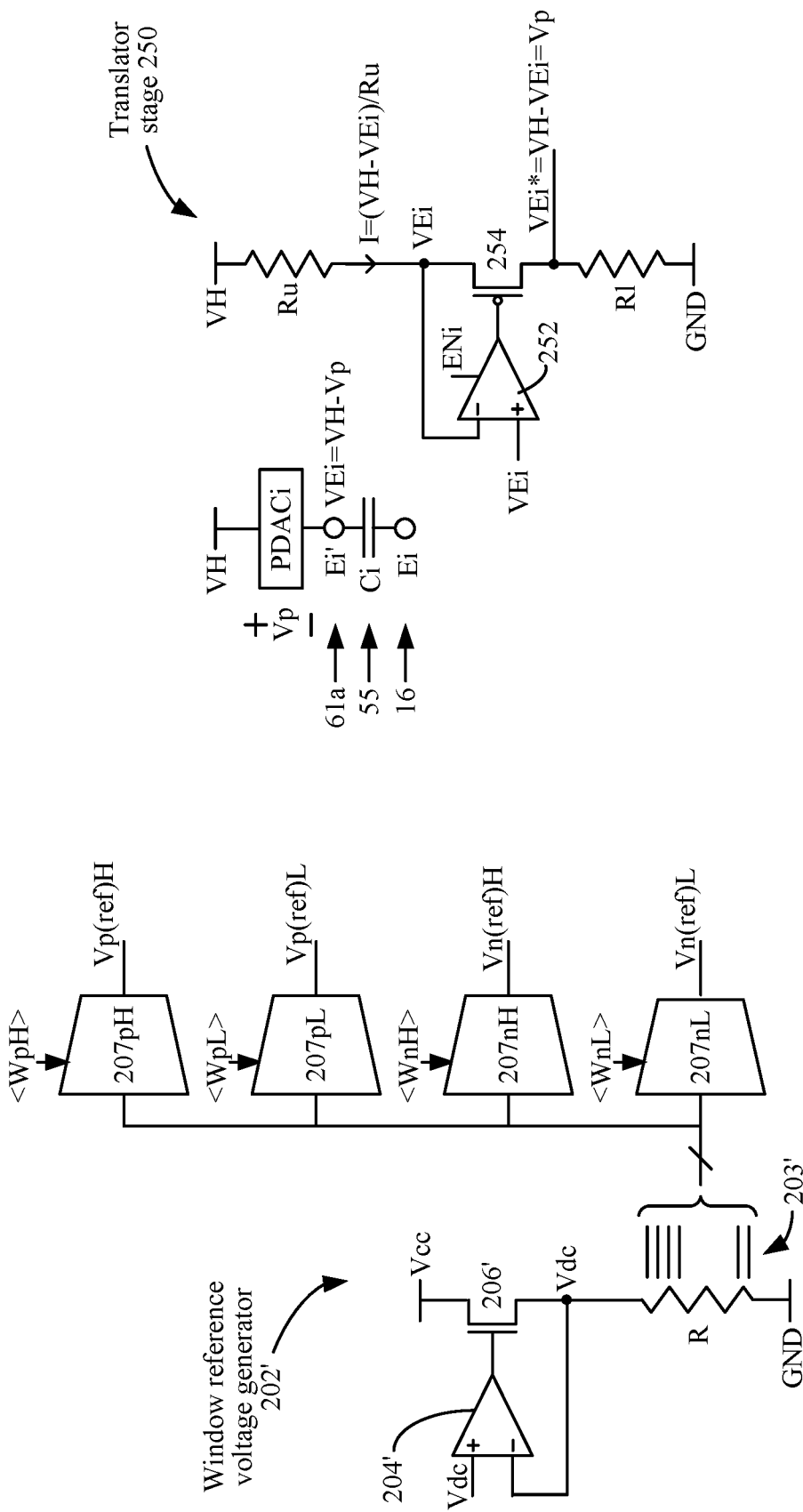
FIGS. 7A-7E show alternative compliance detector circuitry within the ASIC in which anode electrode node voltages can be converted to low-side voltages referenced to ground to ease compliance voltage monitoring and adjustment.
Figure 7C:
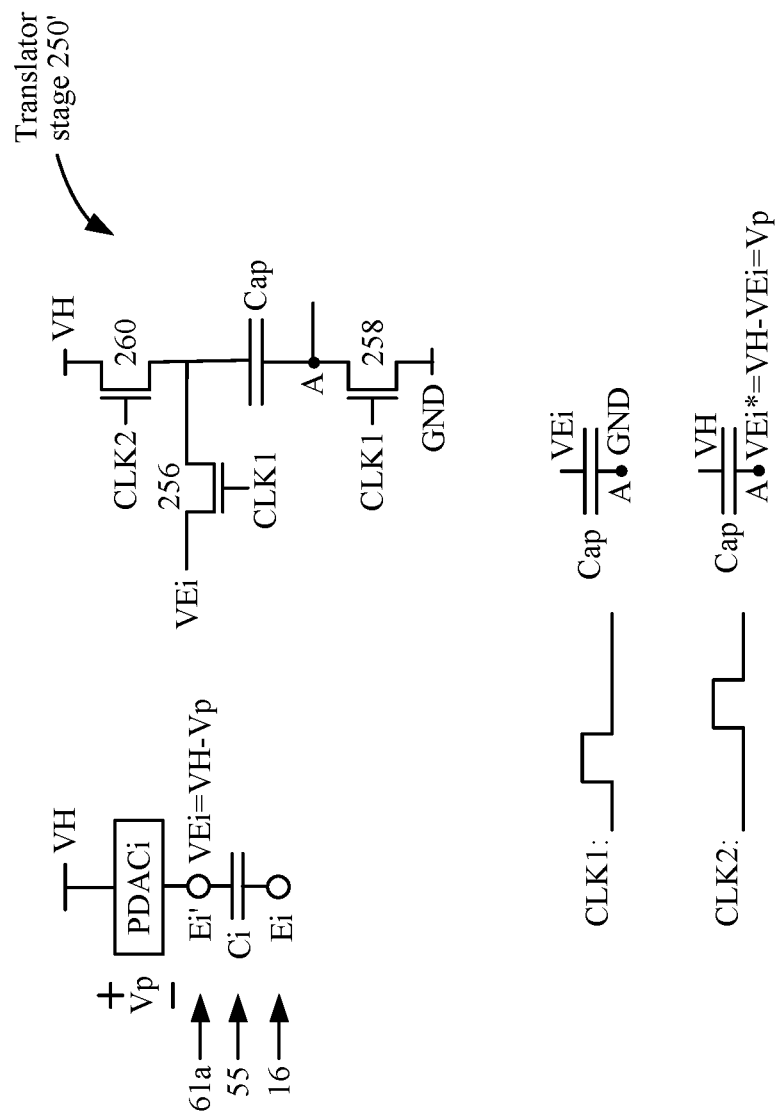
Figure 7D:
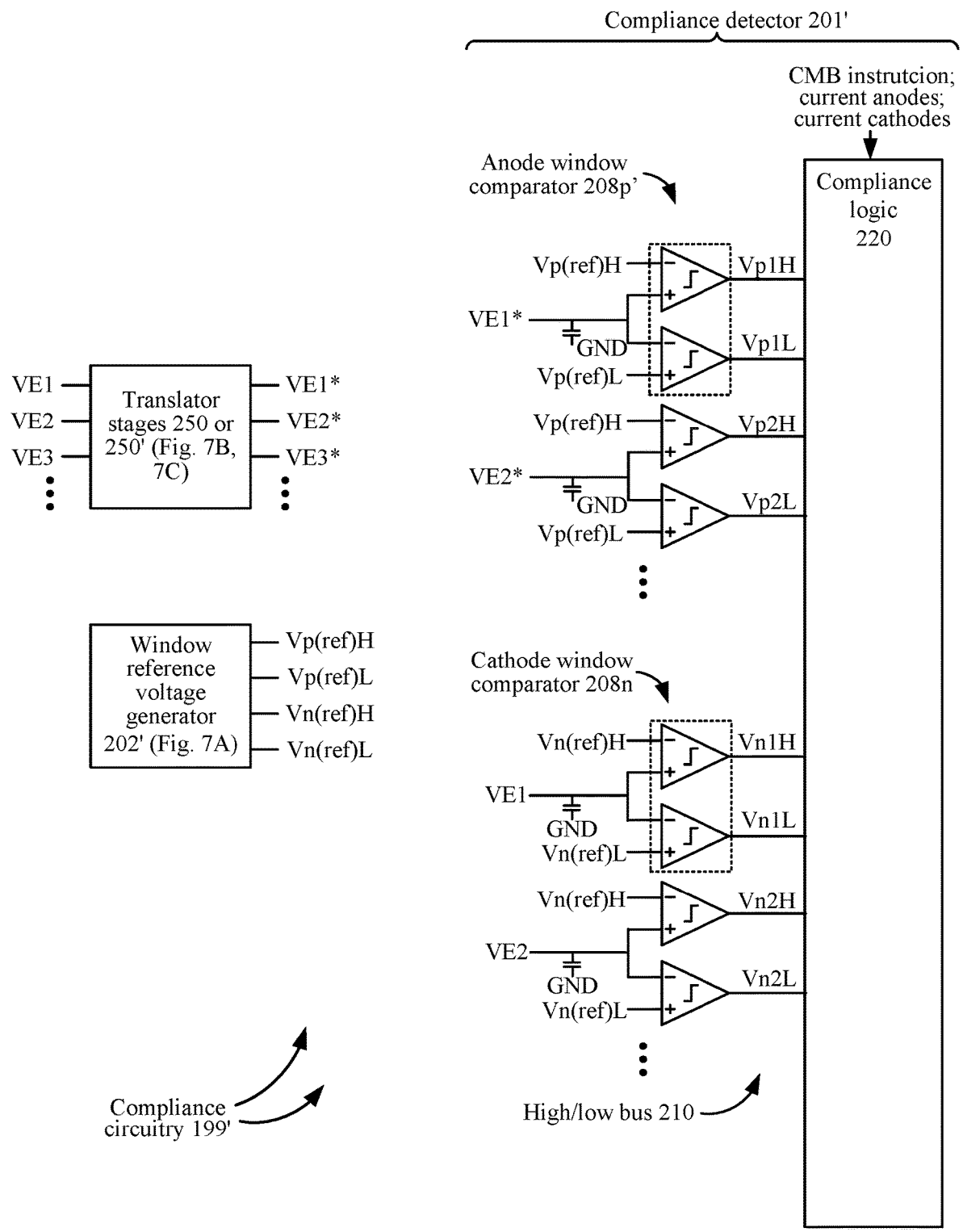

FIGS. 7A-7D show various examples to allow low-side sensing of the anode electrode node voltages. FIG. 7A shows a modified window reference generator 202' used to generate all reference voltages referenced to ground. FIGS. 7B and 7C show different translator stages 250 and 250' that can be used to convert the anode electrode node voltages to low-side voltages referenced to ground. FIG. 7D shows the compliance circuitry 199 as modified when low side sensing is used per FIGS. 7A-7C.

The modified window reference voltage generator 202' in FIG. 7A is somewhat similar to the generator 202 described earlier (FIG. 6B). Generator 202' comprises an op amp 204', which receives a DC reference voltage, Vdc, and which outputs to a transistor 206. Vdc may be any suitable voltage such as 1V or less. A single resistance R is connected between ground and the lower terminal the transistor 206'. Feedback establishes the reference voltage (Vdc) across the resistance R. Because the generator 202' only produces low-side signal referenced to ground, it is not necessary that the generator 202' receive the compliance voltage VH. As such, the upper terminal of the transistor 206' can be coupled to a lower power supply voltage. For example, the upper terminal can be connected to Vcc, which may comprise a general power supply voltage operating in the ASIC 60, such as that used to power its digital circuitry. The upper terminal can also be connected to any other suitable power supply or reference voltage, such as the battery voltage, Vbat, or even the compliance voltage VH.

The resistances R as before comprises a number of taps 203, each providing voltages ranging from Vdc to 0V (e.g., in 40 mV steps). Four multiplexers (MUXes) 207 are used to select the four reference voltages to be used by the anode and cathode window comparators 208p' and 208n. For example, MUX 207nL, under control of bus <WnL> is used to select Vn(ref)L. Allowing each of the reference voltages to be selected independently allows appropriate windows for the voltage drops across the active PDACs and NDACs (Vp and Vn) to be set, as explained earlier. Significantly, and unlike the generator 202 shown earlier (FIG. 6B), generator 202' only produces low-side reference voltages that are referenced to ground. As before, Vn(ref)H>Vn(ref)L to set a permissible range for the cathode electrode voltages VEi. Additionally, and unlike in FIG. 6B, Vp(ref)H>Vp(ref)L to set a permissible range for the low-side anode electrode voltages VEi*, as explained below.

Although not shown, note that a window voltage reference generator 202' could be provided for each electrode. For example, a first generator 202' could provide first reference voltages for electrode node E1' (Vn1(ref)L, Vn1(ref)H, Vp1(ref)L, Vp1(ref)H), while a second generator 202' could provide second reference voltages for electrode node E2' (Vn2(ref)L, Vn2(ref)H, Vp2(ref)L, Vp2(ref)H), etc. This can be useful if the resistances at the various electrodes are different (see Rt, FIG. 3), which would affect the voltages drops Vp and Vn across the PDAC and NDACs for a given compliance voltage. Allowing the reference voltages to be individually tailored for each of the electrodes allows such different resistances to be accounted for.

FIG. 7B shows a first example of a translator stage 250 that is used to translate high-side anode electrode voltages VEi to low-side anode electrode voltages VEI*. In a preferred example, there would be a translator stage 250 provided for every electrode node voltage VEi in the system, although only one is shown.

As shown, the translator stage 250 is powered by VH and ground, receives voltage VEi to be translated at a single measurement input, and produces the translated voltage VEi* at a single output. (In this regard, the translator stage is different from a differential amplifier which necessarily receives two measurement inputs of the voltages whose difference is to be computed by the differential amplifier). The translator stage 250 provides VEi to an op amp 252, whose output is connected to the gate of a PCH transistor 254. The other input of the op amp 252 is connected to the upper terminal of the transistor 254, which through feedback impresses VEi at this point. An upper resistance Ru is provided between the upper terminal and VH. This establishes a voltage drop VH−VEi across the upper resistance Ru, which equals the voltage drop Vp across the PDACi connected to electrode node Ei'. The voltage drop causes a current I=(VH−VEi)/Ru to flow through the transistor 254 and through a lower resistance Rl connected between the transistor's lower terminal and ground. Because upper and lower resistances Ru and Rl are the same value, the same voltage drop VH−VEi is formed across Rl, which comprises the low-side anode electrode voltage VEi*, which again is equal to Vp. The translator stage 250 thus converts high-side anode electrode node voltages VEi referenced to the compliance voltage VH (VH−Vp) to a low-side anode electrode node voltage VEi* referenced to ground (Vp). In other words, the difference of VEi to the high-side power supply of VH (Vp) is preserved as a difference to the low-side power supply of ground. Preferably, upper and lower resistances are each formed as resistors, and preferably as a series connection of smaller resistors adding to Ru and Rl. However, these resistances Ru and Rl may also comprise other resistive components or circuits such as diodes, transistors, and the like.

Note that it is only useful to have translator stages 250 enabled for electrode nodes currently acting as anodes. Translator stages 250 associated with electrode nodes currently acting as cathodes, or that are not involved in providing stimulation, can be disabled to inhibit power draw. Enable signals ENi can be provided to enable or disable the translator stages 250 on an electrode-by-electrode basis. In this regard, note that the pulses provided are often biphasic for the reasons described earlier. Thus, for example, electrode nodes E1/E2 may act as an anode/cathode in a first phase, and as a cathode/anode in a second phase. In this case, EN1 would be activated in VE1's translator stage 250 the first phase, and EN2 would be activated in VE2's translator stage 250 the first phase. In the second phase, these enable signals would be reversed, with EN1 deactivated in VE1's translator stage 250, and EN2 activated in VE2's translator stage 250. Furthermore, note that all of the translator stages 250 can be disabled in the quiet period between successive pulses. Lastly, although not shown, the inputs VEi can include high-voltage switches to disable the translator stages when their operation is not needed.

FIG. 7C shows a second example of a translator stage 250' that is used to translate high-side anode electrode voltages VEi to low-side anode electrode voltages VEI*. Again, as before, the translator stage 250' is powered by VH and ground, receives voltage VEi to be translated at a single measurement input, and produces the translated voltage VEi* at a single output. However, the translator stage 250' also receives control inputs in the form of clocks CLK1 and CLK2 as explained further below. Unlike the circuit 250 of FIG. 7B, low-side voltage VEi* is formed without current coupling. Translator stage 250' operates as a charge pump, by which VEi is to translated to VEi* via a capacitor (Cap). This involves clocking, and two non-overlapping clock signals CLK1 and CLK2 are shown. These clock signals can be generated in any number of manners. A first clock CLK1 turn on switch 256 to transfer VEi to the top plate of the capacitor, and also turns on switch 258 to transfer ground (0V) to the bottom of the capacitor at node A. This stores a voltage difference of VEi across the capacitor. Thereafter, CLK2 turns on switch 260 which transfers the compliance voltage VH to the top plate of the capacitor. This shifts the bottom plate of the capacitor to VH−VEi at node A to maintain the VEi drop across the capacitor established during CLK1. Node A thus comprises the low-side anode electrode node voltage VEi*, which as in circuit 250 equals VH−VEi=Vp.

Once the anode electrode voltages VEi have been converted to low-side voltages VEi*, they are presented to compliance circuitry 199', as shown in FIG. 7D. The compliance circuitry 199' has been modified in certain respects to reflect the fact that only low-side voltages referenced to ground are being assessed. The cathode window comparator circuitry 208n can remain as described earlier (FIG. 6B), because all relevant signals (the cathode electrode node voltages, and reference voltages Vn(ref)H and Vn(ref)L) remain referenced to ground as before. However, the anode window comparator circuitry 208p' is changed, and now essentially matches the cathode window comparator circuitry 208n. The anode window comparators 208p' receive the now-converted low-side anode electrode node voltages VEi*, and reference voltages Vp(ref)H and Vp(ref)L, which as noted earlier are now all referenced to ground by operation of generator 202' and translator stages 250 or 250'. These low-side signals are simpler to process, and the anode window comparators 208' may now be made similarly to the cathode window comparators 208n, without requiring the use of high-voltage components or signal translation, including the resulting logic signals, that now are ground referenced like the rest of the digital circuitry. In operation, the anode window comparators 208p' operate as before, asserting VpiH on high/low bus 210 when VEi* is too high, and VpiL when VEi* is too low.

Figure 7E:
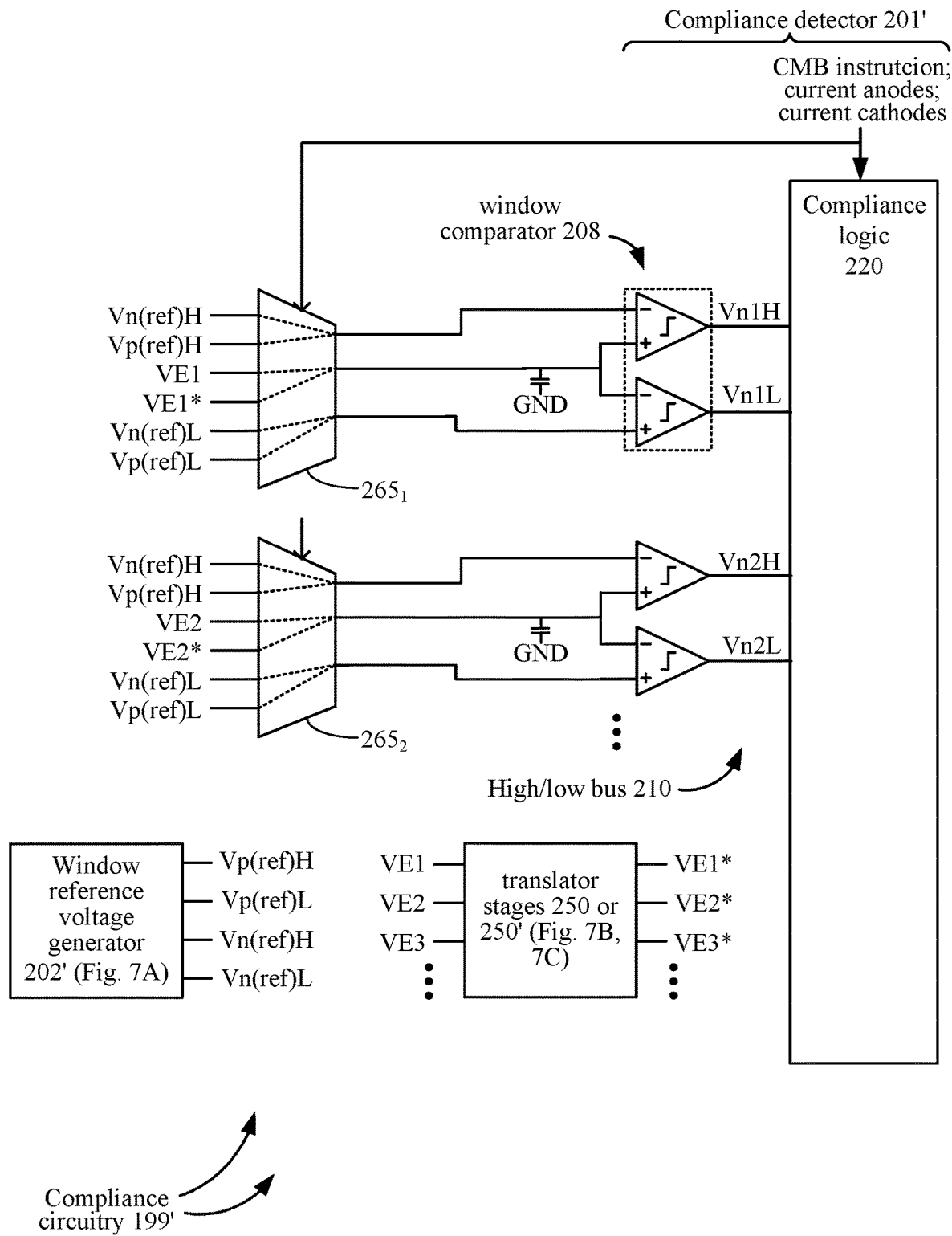

FIG. 7E shows another alternative arrangement that is possible for compliance circuitry 199' when only low-side signals are used for compliance voltage sensing and adjustment. This example recognizes that it is not strictly necessary that each electrode node have its own anode window comparator 208p' and cathode window comparator 208n, because any electrode node can only act as an anode or a cathode at one time. As such, each electrode node may only require one window comparator 208 which can receive both the cathode electrode node voltages VEi and the low-side anode electrode node voltages VEi*. As noted earlier, the compliance logic 220 can be informed whether a given electrode node is being used as an anode or cathode at any given time, and this same information can be used to control MUXes 265i associated with each of the electrode nodes Ei'. Each MUX 265i will pass on to its associated window comparator either (i) a cathode electrode node voltage VEi and reference voltages Vn(ref)L and Vn(ref)H when its associated electrode node Ei' is acting as a cathode; or (ii) a low-side anode electrode node voltage VEi* and reference voltages Vp(ref)L and Vp(ref)H when its associated electrode node Ei' is acting as an anode. Although this requires the addition of the multiplexers 265, the number of window comparators is reduced.

FIGS. 7F and 7G show alternatives translator stages 270 and 270' that can be used to convert any low-side signals (Vlow) referenced to ground to high-side signals (Vhigh) referenced to the compliance voltage VH. These circuits 270 and 270' are similar to the circuits 250 and 250' depicted earlier in FIGS. 7B and 7C. Vlow could represent any low-side voltage used in compliance voltage sensing, such as the cathode electrode voltages VEi or any of the low-side reference voltages, such as generated by generator 202' (FIG. 7A). The translator stage 270 in FIG. 7F uses op amp 252' to impress Vlow across a lower resistance Rl to create a current I=Vlow/Rl. This current is provided through transistor 254' to an upper resistance Ru of equal value to Rl. This establish the same voltage drop Vlow across Ru, which generates Vhigh=VH−Vlow. Thus, Vhigh represents Vlow referenced to Vh. The translator stage 270' in FIG. 7G like circuit 250' (FIG. 7C) uses non-overlapping clocks CLK1 and CLK2. During CLK1, switches 256' and 258' are turned on, thus passing VH to the upper plate of the capacitor at node B, and passing Vlow to the lower plate of the capacitor. This stores a voltage of VH−Vlow across the capacitor. During CLK2, transistor 260' is turned on. This sets the lower plate of the capacitor to ground, which then establishes Vhigh=VH−Vlow on the upper plate at node B to keep the voltage drop established across the capacitor during CLK1. Even though translator stages 270 and 270' lack the benefit of design convenience, they can still be useful in a given case. For example, anode reference voltages generated as low-side signals by generator 202' (Vp(ref)L and Vp(ref)H) could be converted to high-side signals using either of translator stages 270 or 270', as can be helpful in allowing evaluation of unconverted high-side anode electrode voltages VEi using anode window comparators 208p (FIG. 6B) for example.

Figure 2:
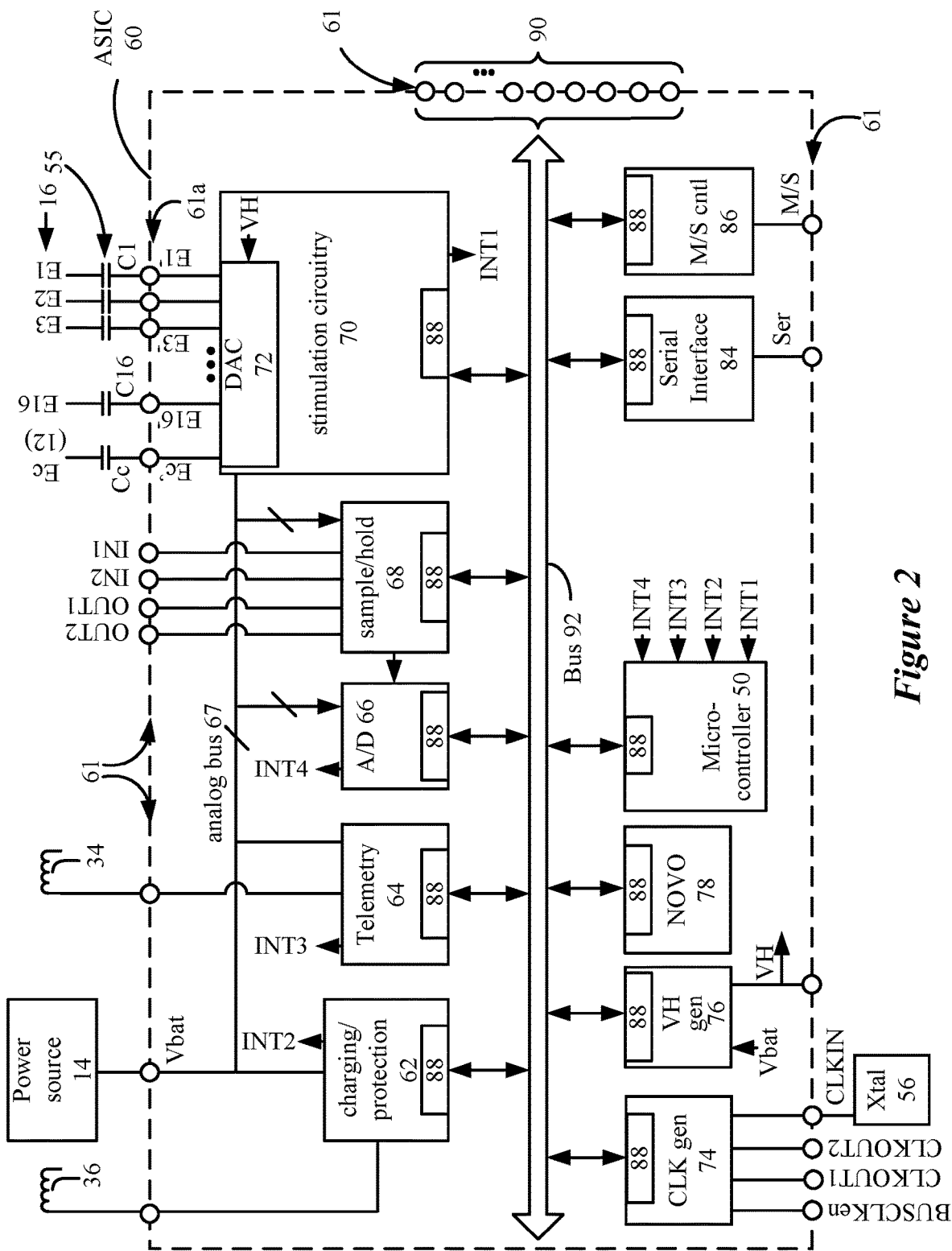
FIG. 2 shows an architecture for an Application Specific Integrated Circuit (ASIC) useable in the IPG.
Figure 8B:
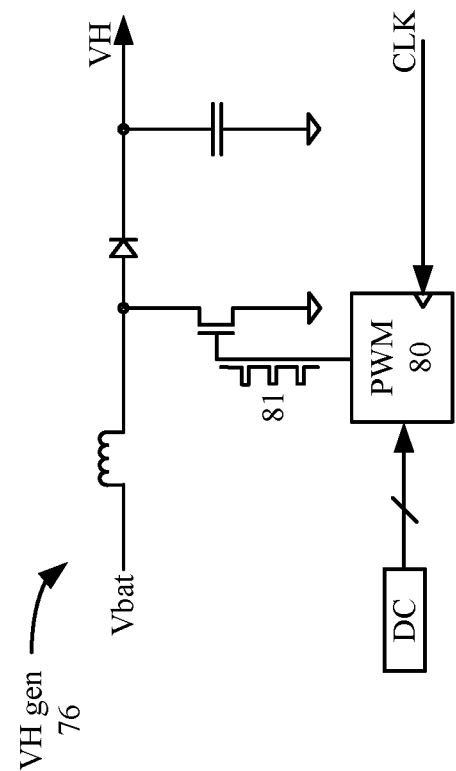
FIGS. 8B and 8C show adjustment of different types of compliance voltage generators.
Figure 8A:
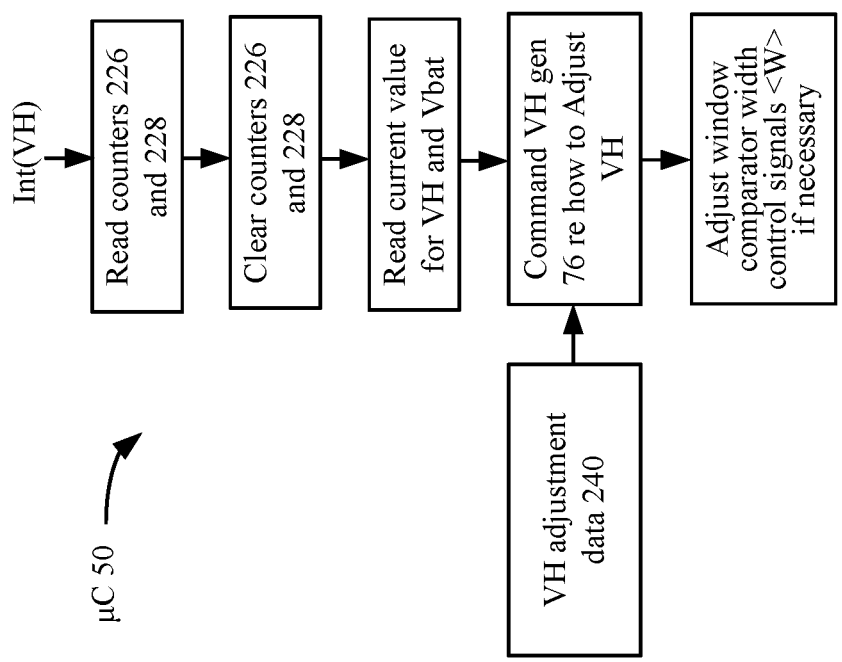
FIG. 8A shows operation of the microcontroller within the ASIC upon receiving an interrupt from the compliance detector to adjust the compliance voltage.

FIG. 8A shows actions the microcontroller 50 can take when it receives the compliance voltage interrupt Int(VH) from the compliance logic 220. First, the microcontroller 50 can read the high counter 226 and low counter 228 via bus 92, and can clear those registers back to a zero count. This is useful so that the microcontroller 50 can understand whether it was interrupted because of an over- or under-compliance voltage condition. However, reading the counters is not strictly necessary. For example, count threshold block 230 could in another example issue two interrupts—Int(VH)H if the high counter 226 is above its count threshold, and Int(VH)L if the low counter 228 is above its count threshold. In other words, the microcontroller 50 may receive a high interrupt and a low interrupt, and so can understand whether the compliance voltage is high or low without having to read any data from the compliance circuitry 199. Next, the microcontroller 50 can read the current value for the compliance voltage, VH, and the battery voltage, Vbat, if it's not already known to it. This can occur by reading VH and Vbat from the A/D block (FIG. 2B).

Thereafter, the microcontroller 50 can command the VH generator 76 (FIG. 2B) as to how to adjust the compliance voltage VH it generates. Such command may be relatively simple: for example, if the compliance voltage is too low (as evidenced by low counter 228), the microcontroller 50 can command the VH generator 76 to increase the compliance voltage, perhaps by some set minimal amount or increment (e.g., 0.5V); if the compliance voltage is too high (as evidenced by high counter 226), the microcontroller 50 can command the VH generator 76 to decrease the compliance voltage, again perhaps by some set amount or increment. The compliance voltage monitoring functions described above can continue to run to verify the effectiveness of the compliance voltage adjustment, and the process may be repeated if the compliance voltage needs further adjustment.

Figure 8C:
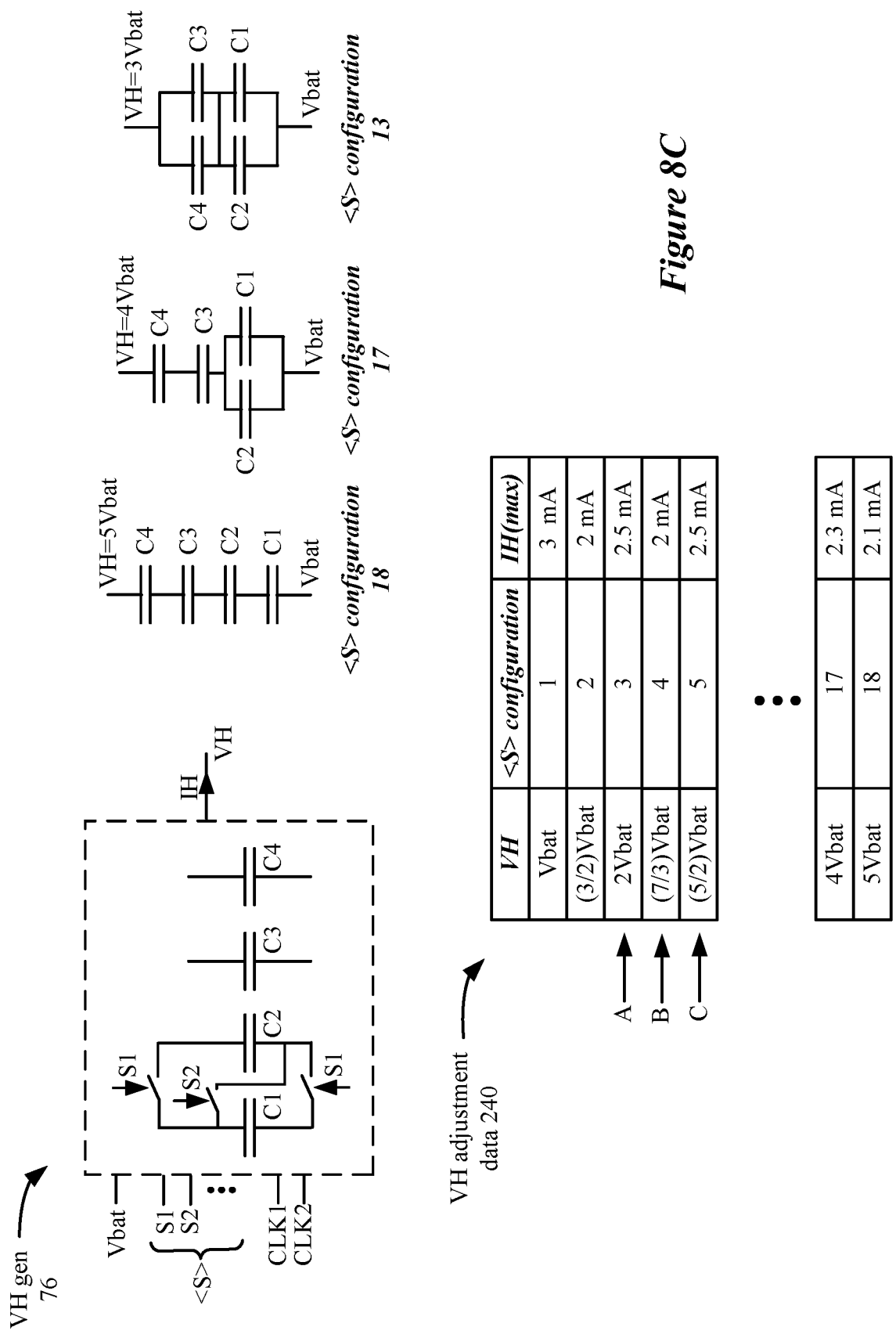

Still referring to FIG. 8A, adjustment to the VH generator 76 may be assisted through the use of VH adjustment data 240, which is preferably stored with the microcontroller 50. Such VH adjustment data 240 may depend on the way the VH generator 76 is built, and two different ways are illustrated in FIGS. 8B and 8C. In FIG. 8B, the VH generator 76 comprises an inductor-based boost circuit, which as is known boosts the battery voltage Vbat to the compliance voltage VH using a pulse width modulator 80 to vary the duty cycle (DC) of a gating signal 81 that controls the converter. Increasing the duty cycle—i.e., the amount of time that the gating signal 81 is on relative to its period— generally increases the compliance voltage VH. See, e.g., U.S. Patent Application Publication 2015/0134029 (discussing boost converter circuitry in further detail). Accordingly, VH adjustment data 240 may not be needed in this design, as the microcontroller 50 can merely command the VH generator 76 to increase or decrease its duty cycle depending whether VH should be increased or decreased.

In FIG. 8C, the VH generator 76 comprises a capacitor-based charge pump. See e.g., U.S. Pat. Nos. 8,219,196; 9,233,254; 7,805,189. In this example, the VH generator 76 comprises a number of capacitors (e.g., C1-C4) that can be charged to the battery voltage, Vbat, during a first clock (CLK1), and then connected together during a second clock cycle in various manners to form various compliance voltages values. The capacitors are connectable by various switches controlled by switch control signals <S> (e.g., S1, S2, etc.). Just a few example switches are shown in FIG. 8C, which are controlled by switch control signals S1 and S2 to respectively either connect capacitors C1 and C2 in parallel or in series. Still other switches and switch control signals would be used to establish various connections to capacitors C3 and C4. A few example configurations of the capacitors are shown: for example, a configuration is shown in which all capacitors are connected by the switches in series (forming VH=5Vbat), which configuration is arrived at by setting the switch control signals with particular values. As one skilled will appreciate, the various switch configurations will establish various compliance voltages VH that comprise fractional multiples of the battery voltage. Microcontroller 50, once interrupted, can command the VH generator 76 to use a different switch configuration to adjust the compliance voltage, VH.

When dealing with a VH generator 76 of this type, VH adjustment data 240 may be useful, and as shown may comprise a table relating the compliance voltage VH with a particular battery voltage and switch configuration. Further, data 240 may associate a maximum current, IH(max), with each configuration. The maximum current providable by each capacitor configuration will depend on the size of the capacitances and the manner in which they are connected. This can be important to assist the microcontroller 50 in deciding how to command the VH generator 76.

For example, assume that it is determined that VH should be increased, and that the compliance voltage VH is currently set by the VH generator 76 at 'A', with a switch configuration 3 that establishes VH=2Vbat. In one example, the microcontroller 50 may increase VH by simply commanding the VH generator 76 to use the next-highest switch configuration 4 for VH in VH adjustment data 240—i.e., 'B,' which will increase VH to (7/3)Vbat. However, the microcontroller 50 may also not simply pick the next-highest or lowest switch configuration for the VH generator 76. For example, the microcontroller 50 may realize that stimulation pulses running in the active timing channel(s) are of a relatively large amplitude. If this is the case, commanding the VH generator 76 to use switch configuration 4 ('B') may not be wise, as the maximum current IH(max) producible in this configuration decreases from 2.5 mA ('A') to 2.0 mA ('B'). Commanding the VH generator 76 to use configuration 'B' might run the risk that the compliance voltage VH will become loaded and unable to form the pulses. Thus, the microcontroller 50 may instead command the VH generator 76 to use switch configuration 5 ('C'). This produces an even higher compliance voltage (VH=(5/2) Vbat), but more importantly provides a compliance voltage with a larger maximum current. To summarize, VH adjustment data 240 can include data indicative of the operation of the VH generator 76 to allow the microcontroller 50 to adjust compliance voltage VH in an informed manner.

As shown in FIG. 8A, along with commanding the VH generator 76 how to adjust the compliance voltage VH, the microcontroller block 50 may also issue the control signals <W> (or <WnH>, <WnL>, <WpH>, and <WpL>) mentioned earlier that are used to selected the reference voltages, and which generally set the width of the permissible voltages drops allowable for the PDAC and NDAC. More specifically, the microcontroller block 50 may via bus 92 write values for the control signals <W> to registers included within the compliance circuitry 199 and compliance logic 220 (FIG. 6A). As mentioned earlier, control signals <W> can be used to set a wide or narrow desired range of acceptable voltages for the window comparators 208p and 208n (FIG. 6B), thus making it respectively less or more likely that high/low signals will be asserted on the bus 210, and hence through operation of the compliance logic 220 (FIG. 6C) that a compliance voltage interrupt Int(VH) will issue.

There are different reasons why the microcontroller 50 may adjust the window comparator width control signals <W>. In one example, the microcontroller 50, after adjusting VH, may initially set <W> to a wide value, and then narrow <W> over time. This will reduce the search time need to establish the compliance voltage VH, and yet deliver an accurate value for VH to save power. In another example, the width may be set based on the amount that VH is adjusted. For example, if a capacitor-based charge pump is used for VH generator 76 (FIG. 8C), VH may be adjusted a small amount—e.g., from (5/4)*Vbat to (4/3)*Vbat, in which case it may only be necessary to widen the comparator windows 208p and 208n by a small amount. By contrast, a larger adjustment, say from 4Vbat to 5Vbat, may warrant widening the comparator windows by a larger amount. The width of the comparator windows may also be scaled in accordance with the battery voltage, Vbat, because VH is ultimately a function of Vbat when a capacitor based charge pump is used. Finally, the number of capacitors used in the charge pump may have an effect on the manner in which the microcontroller 50 sets the width of the comparator windows via control signal <W>. For example, if fewer capacitors were used, the steps in VH creatable by the change pump could be larger, and hence <W> might logically be set to wider values.

Further details concerning compliance voltage monitoring and adjustment in the IPG, and use and control of a charge-pump for the VH generator 76, can be found in PCT (Int'l) Patent Application Publication WO 2021/046120, which is incorporated herein by reference in its entirety.

While disclosed in the context of a particular design for the stimulation circuitry 70 and DAC circuitry 72, the invention isn't so limited. Also, while disclosed in the context of an implantable pulse generator, the improved compliance voltage monitoring and adjustment circuitry could also be implemented in a non-implantable pulse generator, such as an External Trial Stimulator (ETS). See, e.g., U.S. Pat. No. 9,259,574 (describing an ETS).

Although particular embodiments of the present invention have been shown and described, the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A pulse generator, comprising:
   electrode nodes, wherein each of the electrode nodes is configured to be coupled to one of a plurality of electrodes in contact with a patient's tissue;
   stimulation circuitry comprising
      a source circuit coupled to a first power supply voltage, wherein the source circuit is configured when activated to produce a first voltage at a first of the electrode nodes, wherein the first voltage is referenced to the first power supply voltage,
      a sink circuit coupled to a second power supply voltage, wherein the sink circuit is configured when activated to produce a second voltage at a second of the electrode nodes, wherein the second voltage is referenced to the second power supply voltage;
   translator circuitry comprising a single measurement input, wherein the translator circuitry is configured to receive the first voltage at the single measurement input and to convert the first voltage to a third voltage referenced to the second power supply voltage; and
   comparator circuitry configured to assess the second and third voltages by comparing them to one or more threshold voltages.

2. The pulse generator of claim 1, wherein the source circuit and the sink circuit comprise current sources, wherein the source circuit and the sink circuit are configured to produce the first and second voltages by producing a constant current.

3. The pulse generator of claim 1, wherein the first power supply voltage comprises a compliance voltage, and the second power supply voltage comprises ground.

4. The pulse generator of claim 1, wherein the comparator circuitry comprises
   first comparator circuitry configured to compare the second voltage to at least one first threshold voltage and to output a first signal indicating whether the second voltage is higher or lower than the first threshold voltage, and
   second comparator circuitry configured to compare the third voltage to at least one second threshold voltage and to output a second signal indicating whether the third voltage is higher or lower than the second threshold voltage.

5. The pulse generator of claim 4, further comprising a reference voltage generator configured to generate the at least one first threshold voltage and the at least one second threshold voltage, wherein the at least one first threshold voltage is referenced to the second power supply voltage, and wherein the at least one second threshold voltage is referenced to the second power supply voltage.

6. The pulse generator of claim 5, wherein the at least one first threshold voltage and the at least one second threshold voltage are adjustable.

7. The pulse generator of claim 1, wherein the comparator circuitry comprises
   first window comparator circuitry configured to compare the second voltage to a first threshold voltage and a second threshold voltage defining a first window and to output at least one first signal indicating whether the second voltage is within the first window, and
   second window comparator circuitry configured to compare the third voltage to a third threshold voltage and a fourth threshold voltage defining a second window and to output at least one second signal indicating whether the third voltage is within the second window.

8. The pulse generator of claim 7, further comprising a reference voltage generator configured to generate the first, second, third, and fourth threshold voltages, wherein the first, second, third, and fourth threshold voltages are referenced to the second power supply voltage.

9. The pulse generator of claim 8, wherein the first, second, third and fourth threshold voltages are adjustable.

10. The pulse generator of claim 1, wherein the translator circuitry comprises an upper resistance coupled to the first power supply voltage and a lower resistance coupled to the second power supply voltage.

11. The pulse generator of claim 10, wherein the translator circuitry is configured to form a current through the upper and lower resistances by impressing the first voltage across the upper resistance, wherein the third voltage is formed as a voltage drop across the lower resistance.

12. The pulse generator of claim 11, wherein a transistor is coupled between the upper and lower resistances.

13. The pulse generator of claim 1, wherein the translator circuitry comprises a charge pump.

14. The pulse generator of claim 13, wherein the translator circuitry comprises control inputs configured to receive at least a first and second clock.

15. The pulse generator of claim 14, wherein the charge pump comprises a capacitor, wherein the first clock is configured to impress the first voltage across the capacitor, and wherein the second clock is configured to connect a top plate of the capacitor to the first power supply voltage, thereby establishing the third voltage at a lower plate of the capacitor.

16. The pulse generator of claim 1, wherein the comparator circuitry is configured to adjust the first power supply voltage based on the assessment of the second and third voltages.

17. The pulse generator of claim 16, wherein the comparator circuitry is configured to generate a high signal and a low signal for each of the second and third voltages, wherein the comparator circuitry further comprises logic circuitry, wherein the high and low signals are processed at the logic circuitry to determine whether to adjust the first power supply voltage.

18. The pulse generator of claim 17, wherein the logic circuitry comprises
- an over-compliance logic block having a first output and configured to receive the high signals, wherein the over-compliance block applies a first rule to the high signals, wherein the first output is asserted if the first rule is met, and
- an under-compliance logic block having a second output and configured to receive the low signals, wherein the under-compliance block applies a second rule to the low signals, wherein the second output is asserted if the second rule is met.

19. The pulse generator of claim 1, further comprising at least one implantable lead, wherein the electrodes are located on the at least one implantable lead.

* * * * *